(12) United States Patent  
Nakamura et al.

(10) Patent No.: US 8,363,293 B2  
(45) Date of Patent: Jan. 29, 2013

(54) IMAGE FORMATION WITH MISREGISTRATION CORRECTION USING CONVERSION INFORMATION GENERATED FROM REMAINING COLORS AND GRADATION VALUES OF ADJACENT REGION

(75) Inventors: Tomohiro Nakamura, Azumino (JP); Chikara Suzuki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 510 days.

(21) Appl. No.: 12/686,969

(22) Filed: Jan. 13, 2010

(65) Prior Publication Data

US 2010/0182622 A1 Jul. 22, 2010

(30) Foreign Application Priority Data

Jan. 22, 2009 (JP) ................................. 2009-012168

(51) Int. Cl.
*H04N 1/58* (2006.01)
(52) U.S. Cl. ......... 358/518; 358/521; 358/540; 358/504
(58) Field of Classification Search .................... 358/1.9, 358/504, 515, 518, 521, 529, 530, 540; 347/115, 347/116
See application file for complete search history.

(56) References Cited

U.S. PATENT DOCUMENTS

| 5,113,249 | A | * | 5/1992 | Yosefi | 358/540 |
|---|---|---|---|---|---|
| 7,362,467 | B1 | | 4/2008 | Tsukimura | 358/1.9 |
| 7,916,368 | B2 | * | 3/2011 | Hiramatsu | 358/518 |
| 8,149,457 | B2 | * | 4/2012 | Suzuki et al. | 358/1.9 |
| 2009/0109456 | A1 | * | 4/2009 | Suzuki et al. | 358/1.9 |
| 2009/0109507 | A1 | * | 4/2009 | Suzuki et al. | 358/521 |

FOREIGN PATENT DOCUMENTS

| JP | 08-030063 | 2/1996 |
|---|---|---|
| JP | 2002-165104 | 6/2002 |
| JP | 2004-122692 | 4/2004 |
| JP | 3852234 | 11/2006 |

\* cited by examiner

*Primary Examiner* — Scott A Rogers
(74) *Attorney, Agent, or Firm* — DLA Piper LLP (US)

(57) ABSTRACT

An image forming apparatus performs image formation using colorants of various colors. In relation to a target image, when a first region, formed using colorants of a black color and not using colorants of remaining colors is adjacent to a second region formed using the colorants of the remaining colors and not using the colorants of the black color, the first region is generated using the colorants including the remaining colors based on conversion information generated according to the remaining colors of the second region.

6 Claims, 17 Drawing Sheets

FIG. 2

| No. | LABEL | CONDITION |
|---|---|---|
| 1 | W (WHITE) | ALL C, M, Y, K ARE ZERO |
| 2 | C (CYAN) | C IS NOT ZERO AND M, Y, K ARE ZERO |
| 3 | M (MAGENTA) | M IS NOT ZERO AND C, Y, K ARE ZERO |
| 4 | Y (YELLOW) | Y IS NOT ZERO AND C, M, K ARE ZERO |
| 5 | CM | C, M ARE NOT ZERO AND Y, K ARE ZERO |
| 6 | CY | C, Y ARE NOT ZERO AND M, K ARE ZERO |
| 7 | MY | M, Y ARE NOT ZERO AND C, K ARE ZERO |
| 8 | CMY | C, M, Y ARE NOT ZERO AND K IS ZERO |
| 9 | K_C (MIXED COLOR K) | ANY ONE OF CMY HAS VALUE AND K IS NOT ZERO |
| 10 | K_L (MONO-CHROMATIC K LIGHT) | ALL CMY ARE ZERO, K EXCEEDS ZERO AND IS SMALLER THAN a |
| 11 | K_D (MONO-CHROMATIC K DARK) | ALL CMY ARE ZERO, AND K IS EQUAL TO OR LARGER THAN a AND EQUAL TO OR LESS THAN 255 |
| 12 | K_D_nonComp | CASE IN WHICH LABEL IS K_D AND DIFFERENCE BETWEEN GRADATION VALUE OF K_D AND GRADATION VALUE OF K_D or K_L IN 8 PERIPHERAL PIXELS OF K_D IS SMALLER THAN PREDETERMINED VALUE b. FURTHER, CASE IN WHICH K_D_nonComp EXISTS IN 8 PERIPHERAL PIXELS. (OBJECT NOT TO BE CORRECTED) |
| 13 | K_D_Comp | CASE IN WHICH LABEL IS K_D AND OTHER THAN No. 12 (CANDIDATE TO BE CORRECTED) |
| 14 | Comp_C | PIXEL OF REGION TO BE CORRECTED BEING IN CONTACT WITH C |
| 15 | Comp_M | PIXEL OF REGION TO BE CORRECTED BEING IN CONTACT WITH M |
| 16 | Comp_Y | PIXEL OF REGION TO BE CORRECTED BEING IN CONTACT WITH Y |
| 17 | Comp_CM | PIXEL OF REGION TO BE CORRECTED BEING IN CONTACT WITH C, M |
| 18 | Comp_CY | PIXEL OF REGION TO BE CORRECTED BEING IN CONTACT WITH C, Y |
| 19 | Comp_MY | PIXEL OF REGION TO BE CORRECTED BEING IN CONTACT WITH M, Y |
| 20 | Comp_CMY | PIXEL OF REGION TO BE CORRECTED BEING IN CONTACT WITH C, M, Y |
| 21 | Comp_W | PIXEL OF CANDIDATE REGION TO BE CORRECTED BEING IN CONTACT WITH W |
| 22 | Comp_WC | PIXEL OF CANDIDATE REGION TO BE CORRECTED BEING IN CONTACT WITH W, C |
| 23 | Comp_WM | PIXEL OF CANDIDATE REGION TO BE CORRECTED BEING IN CONTACT WITH W, M |
| 24 | Comp_WY | PIXEL OF CANDIDATE REGION TO BE CORRECTED BEING IN CONTACT WITH W, Y |
| 25 | Comp_WCM | PIXEL OF CANDIDATE REGION TO BE CORRECTED BEING IN CONTACT WITH W, C, M |
| 26 | Comp_WCY | PIXEL OF CANDIDATE REGION TO BE CORRECTED BEING IN CONTACT WITH W, C, Y |
| 27 | Comp_WMY | PIXEL OF CANDIDATE REGION TO BE CORRECTED BEING IN CONTACT WITH W, M, Y |
| 28 | Comp_WCMY | PIXEL OF CANDIDATE REGION TO BE CORRECTED BEING IN CONTACT WITH W, C, M, Y |

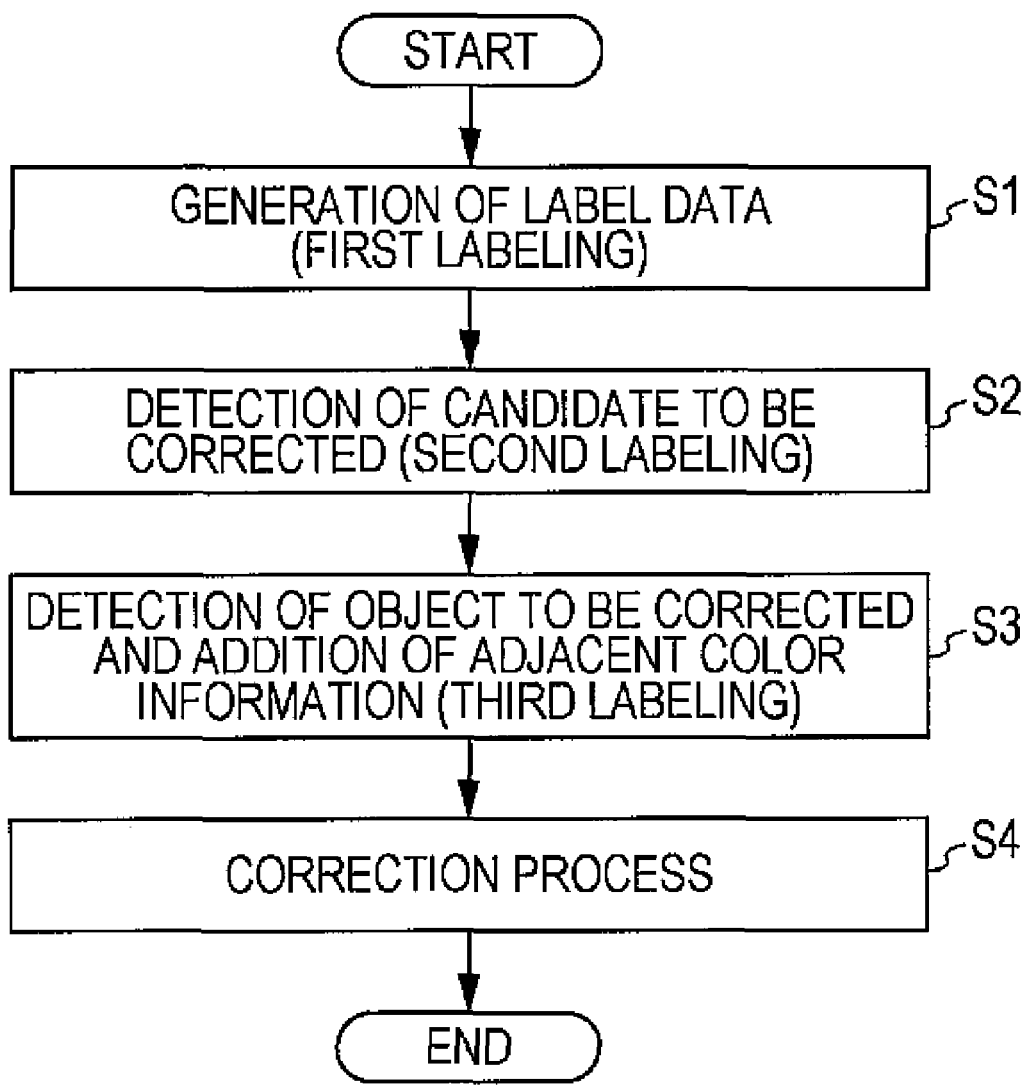

MOVEMENT OF TARGET PIXEL IN BACKWARD DIRECTION

MOVEMENT OF TARGET PIXEL IN FORWARD DIRECTION

8 PERIPHERAL PIXELS

FIG. 6A
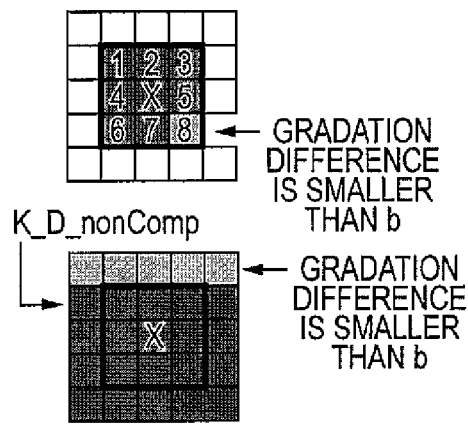
FIG. 6B
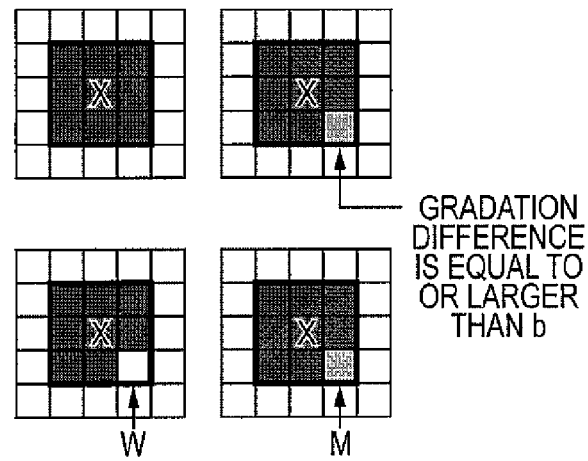
FIG. 7A
ONE TIME PROCESS ONLY
IN FORWARD DIRECTION
FIG. 7B
TWO-TIMES PROCESS IN
FORWARD DIRECTION AND
BACKWARD DIRECTION
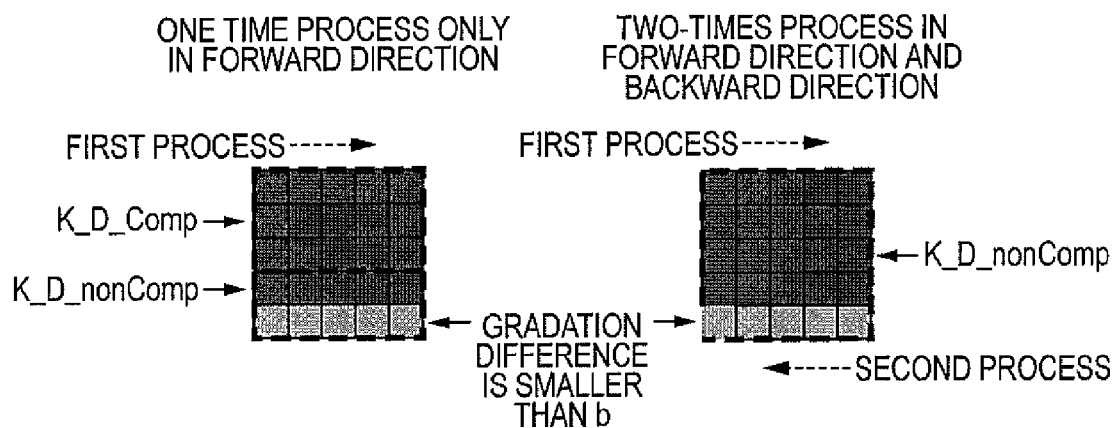

FIG. 11A
| W | W | W | W | W | W | W | W | W |
|---|---|---|---|---|---|---|---|---|
| W | Comp_W (1) | Comp_W (1) | Comp_W (1) | Comp_W (1) | Comp_W (1) | Comp_W (1) | Comp_W (1) | Comp_W (1) |
| W | Comp_W (1) | Comp_W (2) | Comp_W (2) | Comp_W (2) | Comp_W (2) | Comp_W (2) | Comp_W (2) | Comp_W (2) |
| W | Comp_W (1) | Comp_W (2) | Comp_W (3) | Comp_W (3) | Comp_W (3) | Comp_W (3) | Comp_W (3) | Comp_W (3) |
| W | Comp_W (1) | Comp_W (2) | Comp_W (3) | Comp_W (4) | Comp_W (4) | Comp_W (4) | Comp_W (4) | Comp_W (4) |
| W | Comp_W (1) | Comp_W (2) | Comp_W (3) | Comp_W (4) | Comp_W (5) | Comp_W (5) | Comp_W (5) | Comp_W (5) |
| W | Comp_W (1) | Comp_W (2) | Comp_W (3) | Comp_W (4) | Comp_W (5) | K_D_Comp | K_D_Comp | K_D_Comp |
FIG. 11B
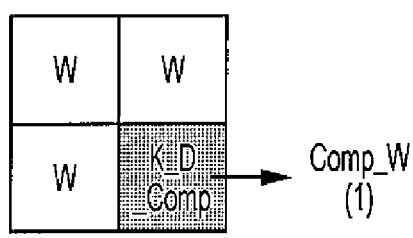
FIG. 11C
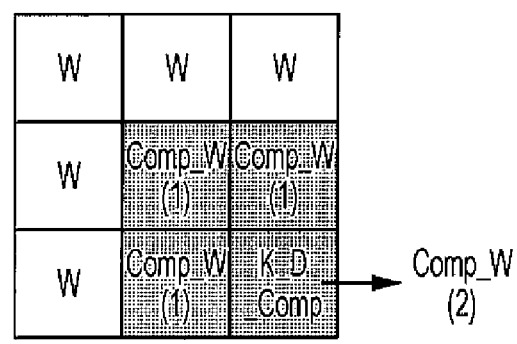

FIG. 15A

| W | W | W | W | W | W | W | W | W |
|---|---|---|---|---|---|---|---|---|
| W | Comp_W (1) | Comp_W (1) | Comp_W (1) | Comp_W (1) | Comp_W (1) | Comp_W (1) | Comp_W (1) | Comp_W (1) |
| W | Comp_W (1) | Comp_W (2) | Comp_W (2) | Comp_W (2) | Comp_W (2) | Comp_W (2) | Comp_W (2) | Comp_W (2) |
| W | Comp_W (1) | Comp_W (2) | Comp_W (3) | Comp_W (3) | Comp_W (3) | Comp_W (3) | Comp_W (3) | Comp_W (3) |
| W | Comp_W (1) | Comp_W (2) | Comp_W (3) | Comp_W (4) | Comp_W (4) | Comp_W (4) | Comp_W (4) | Comp_W (4) |
| W | Comp_W (1) | Comp_W (2) | Comp_W (3) | Comp_W (4) | Comp_W (5) | Comp_W (5) | Comp_W (5) | Comp_W (5) |
| W | Comp_W (1) | Comp_W (2) | Comp_W (3) | Comp_W (4) | Comp_W (5) | K_D_Comp | K_D_Comp | K_D_Comp |

FIG. 15B

| W | W | W |
|---|---|---|
| W | Comp_W (1) | K_D_Comp |
| W | K_D_Comp | K_D_Comp |

FIG. 15C

| Comp_W (1) | Comp_W (1) | Comp_W (1) |
|---|---|---|
| Comp_W (1) | Comp_W (2) | K_D_Comp |
| K_D_Comp | K_D_Comp | K_D_Comp |

IMAGE FORMATION WITH MISREGISTRATION CORRECTION USING CONVERSION INFORMATION GENERATED FROM REMAINING COLORS AND GRADATION VALUES OF ADJACENT REGION

CROSS-REFERENCE TO RELATED APPLICATIONS

This application claims the benefit of priority under 35 USC 119 of Japanese application no. 2009-012168, filed on Jan. 22, 2009, which is incorporated herein by reference.

BACKGROUND

1. Technical Field

The present invention relates to an image forming apparatus or the like that performs a process of supplying colorants for each color, and more particularly to an image forming apparatus or the like that can efficiently perform a correction process with respect to misregistration occurring due to the process of supplying colorants, without causing degradation of image quality.

2. Related Art

In an image forming apparatus such as a laser printer, a process of attaching colorants of each color to a sheet, an intermediate medium or a photosensitive body by supplying the colorants thereto is performed independent of each color. A case may occur in which formed images of each color are relatively out of alignment depending on the mechanical accuracy of the apparatus. If such misregistration (also called color shift) occurs, it adversely affects the output quality, for example, producing white portions (voids) that have not been initially present on the boundaries between characters and background. In this regard, a process of correcting in advance image data to be output has been performed to prevent defects caused by such misregistration.

Japanese Patent No. 3852234 suggests an apparatus that effectively prevents so-called edge light coloring and performs a rapid process. Further, JP-A-2002-165104 discloses an apparatus that performs a trapping process such that an object seems to be of the same order as an actual one even if printing deviation occurs.

However, in the apparatus of Japanese Patent No. 3852234, since a region where image data is corrected is determined in object units of an image, when objects such as characters or graphics, which have to be corrected originally, are incorporated into objects such as images, which are not corrected, in an application level of supplying image data, correction is not performed with respect to these objects, so that a correction process is not reliably performed. Further, image data received in an image forming apparatus such as a printer is represented by a PDL of various formats, and the classification of objects is established for each format. Therefore, in the aforementioned process in object units, respective processing procedures have to be prepared for each format and the process becomes complicated and inefficient.

Further, in the apparatus of JP-A-2002-165104, a process of establishing a correction range and a correction color by the brightness difference between adjacent regions may become complicated.

On the other hand, in the most general usage mode of image forming apparatuses, a void caused by the misregistration that occurs between a black character or graphic and a color background is a serious problem. However, no method for resolving this problem has been suggested.

In this regard, a method for efficiently resolving this problem is needed in a process in pixel units that is considered to be a time-consuming process.

SUMMARY

An advantage of some aspects of the invention is to provide an image forming apparatus or the like that can reliably and efficiently perform a correction process with respect to misregistration occurring due to a process of supplying colorants for each color, and can prevent degradation of image quality.

According to one aspect of the invention, an image forming apparatus performs image formation by using colorants of various colors, wherein, in relation to a target image, when a first region formed using colorants of a black color and not using colorants of remaining colors is adjacent to a second region formed using the colorants of the remaining colors and not using the colorants of the black color, the first region is generated using the colorants including the remaining colors based on conversion information generated according to the remaining colors of the second region.

In this case, the conversion information preferably includes density gradation values of each color when a monochromatic black color is represented by a mixed color, is prepared for each remaining color of the second region, and is set such that the density gradation value of a target color, for which the conversion information is prepared, is higher than the density gradation values of colors other than the target color.

Further, the conversion information is preferably generated based on highest density values of each color, which are output from an image forming apparatus serving as a reference, according to reference information generated in advance with respect to the image forming apparatus.

Furthermore, the density gradation value of the target color is preferably set to be equal to or higher than a value established in advance.

According to another aspect of the invention, an image forming method in an image forming apparatus performs image formation by using various colorants, wherein, in relation to a target image, when a first region formed using colorants of a black color and not using colorants of remaining colors is adjacent to a second region formed using the colorants of the remaining colors and not using the colorants of the black color, the first region is generated using the colorants including the remaining colors based on conversion information generated according to the remaining colors of the second region.

According to a further aspect of the invention, a print data generation program causes a host device of an image forming apparatus to execute a process of generating print data for the image forming apparatus that performs image formation by using various colorants, the print data generation program causing the host device to execute a process of, in relation to a target image, when a first region formed using colorants of a black color and not using colorants of remaining colors is adjacent to a second region formed using the colorants of the remaining colors and not using the colorants of the black color, setting the first region as the print data generated using the colorants including the remaining colors based on conversion information generated according to the remaining colors of the second region.

Other objects and features of the invention will become apparent from the below-described embodiments of the invention.

BRIEF DESCRIPTION OF THE DRAWINGS

The invention will be described with reference to the accompanying drawings, wherein like numbers reference like elements.

FIG. 2 is a table illustrating labels assigned to each pixel.

FIG. 3 is a flowchart of a correction process as a measure against misregistration.

FIGS. 6A and 6B are views illustrating the process content in second labeling.

FIGS. 7A and 7B are views illustrating the necessity of a reciprocation process in second labeling.

FIGS. 11A-11C are views illustrating transfer of information related to W.

FIGS. 15A-15C are views illustrating transfer of information related to W.

DESCRIPTION OF EXEMPLARY EMBODIMENTS

Figure 1:
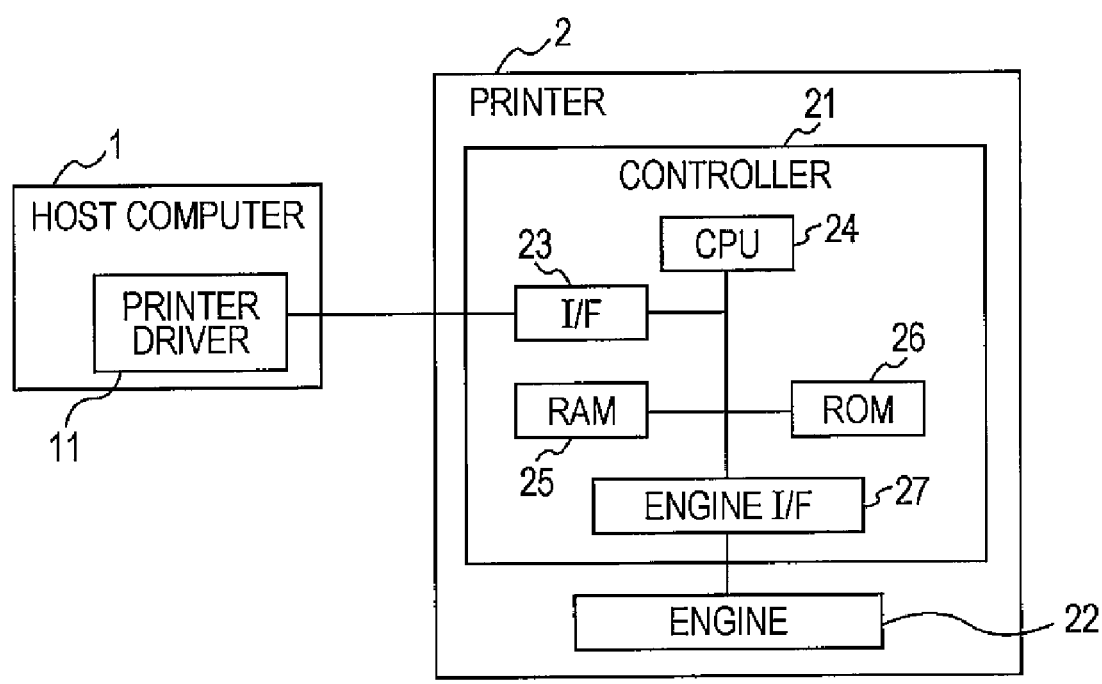
FIG. 1 is a block diagram of an image forming apparatus embodied as a printer according to an embodiment of the invention.

Embodiments of the invention are now described with reference to the accompanying drawings. However, the scope of the invention is not limited to these embodiments. Further, the same reference numerals or symbols are used to designate the same or similar elements throughout the drawings.

FIG. 1 is a block diagram of an image forming apparatus embodied as a printer 2 according to an embodiment of the invention. According to the printer 2, when a correction process as a measure against misregistration is performed with respect to bit map data of an image to be corrected, a monochromatic black region to be corrected is represented by a mixed black color by using conversion tables 30 prepared with respect to colors in contact with the region to be corrected, so that the correction process is performed without causing degradation of image quality. Further, the conversion tables 30 are automatically generated from seven basic tables of each color, which are generated with respect to a printer serving as a reference, based on a colorimetric result of the printer 2, and are used for reducing a design load of the relevant table depending on the body of the printer.

A host computer 1 as illustrated in FIG. 1 serves as a host device that transmits a print request to the printer 2, and includes a personal computer or the like. The host computer 1 includes a printer driver 11. When the print request is made, the printer driver 11 generates print data including image data and a control command and transmits the print data to the printer 2 in response to user manipulation. Herein, the data transmitted from the printer driver 11 to the printer 2 is represented by PDL. Further, the printer driver 11 can be composed of a program designed to execute the above process and a control device of the host computer 1 that executes the process according to the program. The program dedicated for the printer driver 11 can be installed in the host computer 1 through downloading from a predetermined site via a network such as the Internet, or can be installed in the host computer 1 from a storage medium such as a CD.

The printer 2 may be a laser printer including a controller 21, an engine 22 or the like as illustrated in FIG. 1.

The controller 21 outputs a printing instruction to the engine 22 after receiving a print request from the host computer 1, and includes an I/F 23, a CPU 24, a RAM 25, a ROM 26 and an engine I/F 27 as illustrated in FIG. 1.

The I/F 23 is a unit that receives the print data transmitted from the host computer 1.

The CPU 24 controls various processes performed by the controller 21. When a print request is received from the host computer 1, the CPU 24 generates bit map data (plane data of each color) that is obtained by executing a predetermined image process with respect to the image data included in the received print data and then is output to the engine 22, instructs an accurate printing process to the engine 22 after interpreting the control command included in the print data, or the like. Further, the CPU 24 performs a correction process as a measure against misregistration in relation to the process of generating the bit map data. The embodiment is characterized in that the correction process is performed in the printer 2, and a detailed description thereof is given later. The processes executed by the CPU 24 are performed mainly according to the program stored in the ROM 26.

The RAM 25 stores the received print data, the image data after each process is performed, or the like, and stores the above-described bit map data (plane data) of each color and label data (plane data) generated with respect to the bit map data. The bit map data and the label data are described in detail later. Further, the RAM 25 stores the above-described conversion tables 30 dedicated for the printer 2.

The ROM 26 stores a program of each process executed by the CPU 24. Further, the ROM 26 stores the above-described seven basic tables of each color, which are generated with respect to the printer serving as the reference.

The engine I/F 27 is a unit that serves as an interface between the controller 21 and the engine 22. In detail, when printing is performed by the engine 22, the engine I/F 27 reads the image data (the bit map data after the correction process), which is stored in the RAM 25, at a predetermined timing, and transfers the image data to the engine 22 after performing a predetermined process with respect to the image data. Although not illustrated in FIG. 1, the engine I/F 27 includes a memory for temporarily storing data, a decompression unit, a screen process unit or the like, and performs the decompression of compressed data and a screen process of converting the compressed data into dot data with respect to the image data read out from the RAM 25. In detail, the engine I/F 27 is provided by ASIC.

The engine 22 includes a mechanism controller and a printing mechanism. The printing mechanism includes a photosensitive drum, a charging unit, an exposure unit, a development device, a transfer unit or the like. When printing is performed, the photosensitive drum is electrically charged by the charging unit, and the charged photosensitive drum is irradiated with a beam of a light source such as a laser or LED array included in the exposure unit, so that an electrostatic latent image is formed. Thereafter, the latent image is developed into an image by a developer of the development device provided with a toner cartridge that receives the developer (toner), and the developed toner image is transferred by the transfer unit onto a print medium such as a sheet, where the image is fixed by a fixing unit. Then, the print medium is discharged out of the printer 2. In the printer 2, colorants of CMYK colors are used as the developer, and the supply of the colorants is performed independently for each color in at least one of the processes of supplying the colorants to the photosensitive body, supplying the colorants to an intermediate transfer medium, and supplying the colorants to the print medium. Thus, in the printer 2, the image position on the print medium may be shifted depending on colors.

In the printer 2, the print request is received from the host computer 1, the print data is interpreted and the bit map data having gradation values of each color for each pixel is generated from the image data in the PDL format. The bit map data is composed of plane data of each CMYK color of the colorants with respect to one sheet of print medium, and is stored in an image buffer of the RAM 25. Then, a correction process as a measure against misregistration is performed with respect to the bit map data, the corrected bit map data is read out from the engine I/F 27, and the printing process is performed by the engine 22 after the above-described process. As described above, the embodiment is characterized in that the correction process as a measure against, misregistration is performed in the printer 2. Hereinafter, the correction process is described in detail.

According to the correction process in the printer 2, since the labeling, that is, the assignment of the label data, is performed with respect to each pixel of the bit map data, the label data is first described. FIG. 2 is a view illustrating labels assigned to each pixel. As illustrated in FIG. 2, 28 labels Nos. 1-28 are prepared.

Labels 1-11 (first classification information) are assigned in a first labeling that is described later, and are used as information identifying colors of the pixels. Since each pixel has gradation values (e.g., values of 0-255) of CMYK colors at the time point at which the correction is performed, these values are set such that labels satisfying the conditions as illustrated in the "conditions" of FIG. 2 are assigned. For example, the label W (white) is assigned to a pixel in which all gradation values of CMYK colors are 0, and the label K_D (monochromatic K dark) is assigned to a pixel in which all gradation values of CMY are 0 and the gradation value of K is equal to or higher than "a" (e.g., 166) and is equal to or less than 255. Other labels are properly assigned to corresponding pixels according to the conditions as illustrated in FIG. 2.

In colors satisfying the conditions related to the labels 2-8, since the gradation value of K is 0, K toner is not used. However, since other colors may be provided, all these colors are generically referred to as "Color". Further, colors satisfying the conditions related to the labels 1, 9, 10 and 11 will be referred to as "White", "Mixed Color K", "Monochromatic K Light" and "Monochromatic K Dark", respectively. In the printer 2, since the above-described void may occur in a section in which a region of the "Monochromatic K Dark" is in contact with the "Color", correction is performed with respect to the region of the "Monochromatic K Dark" to prevent the void.

Labels 12 and 13 (second classification information) are assigned in a second labeling that is described later, and are used to classify pixels having the label No. 11 assigned thereto into an object not to be corrected and a candidate to be corrected. The label K_D_nonComp of the object not to be corrected is assigned to a pixel having a color of the "Monochromatic K Dark", which may be corrected, that is, a pixel having the label K_D assigned thereto. In detail, the label K_D_nonComp is assigned to an object, in which density of K varies little by little in the region (region having only the color of K) of the monochromatic K that includes the corresponding pixels. In other words, the label K_D_nonComp is assigned to a pixel of the so-called gradation region. Meanwhile, the label K_D_Comp of the candidate to be corrected is assigned to a pixel, which does not satisfy the condition of the label K_D_nonComp, among pixels having the label K_D assigned thereto. The pixel, to which the label K_D_Comp is assigned, becomes a candidate for which the correction for preventing misregistration is performed.

Labels 14-28 (third classification information) are assigned in a third labeling that is described later, and represent color information of pixels of the "Color" or the "White", which are in contact with the region (specifically, a region where the pixels having the label K_D_Comp assigned thereto are arranged in a row) of the "Monochromatic K Dark" including the corresponding pixels. Then, labels 14-20 are assigned to pixels to be finally corrected, and labels 21-28 are assigned to pixels separated from an object to be corrected, which is a short distance away from the pixel of the "White".

For example, the Comp_C of No. 14 is assigned to a pixel in the region to be corrected, which is adjacent to the pixel to which the label C of No. 2 is assigned. Further, the Comp_WC of No. 22 is assigned to a pixel which is just a short distance (e.g., within the range of five pixels) away from the pixel, to which the W is assigned, among pixels included in a candidate region (a region where the pixels having the label K_D_Comp assigned thereto are arranged in a row) to be corrected, which is adjacent to both the pixel to which the label C of No. 2 is assigned and the pixel to which the label W of No. 1 is assigned. The same manner is applied to other labels.

A case may occur in which the labels 14-28 include predetermined distance information by several labeling methods which are described later, in addition to the labels as illustrated in FIG. 2.

The correction process as a measure against misregistration is performed using the label information as described above. FIG. 3 is a flowchart of the correction process. As described above, after the print request is received, if the generation of the bit map data is completed by the CPU 24, the correction process is started, and generation of a label plane (first labeling) is first performed (Step S1). In detail, the pixels are classified into predetermined groups based on the generated bit map data, and labels corresponding to the classified group are assigned to each pixel. That is, labels 1-11 as illustrated in FIG. 2 are assigned corresponding to colors (gradation values of the bit map data) of the pixels. The information of the assigned labels is maintained in the RAM 25 as label data, and label planes are generated with respect to one sheet of the print medium, similarly to the bit map data of each color.

Figure 4A:
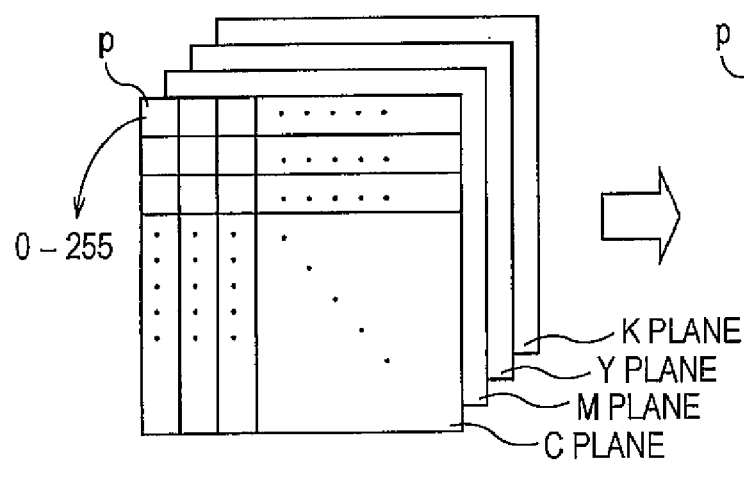
FIG. 4 is an exemplary view illustrating bit map data and a label plane.

FIG. 4 is exemplary view illustrating the bit map data and the label plane. The generated bit map data is illustrated in FIG. 4A. As described above, the bit map data includes a C plane, an M plane, a Y plane and a K plane. Each pixel (p in the FIG. 4) of each plane has a gradation value of each color. Herein, each color is represented by 256 gradations from 0-255, and each pixel has any one of the values from 0-255.

Figure 4B:
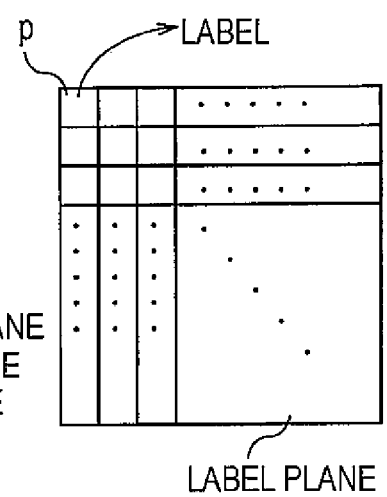

The label data generated from the bit map data of FIG. 4A is illustrated in FIG. 4B. Each pixel (p in the FIG. 4) has the label (data). Further, the generated label plane has identification information of colors of the pixels in the first labeling level, but the content of the label plane is properly updated to necessary information in the second labeling and the third labeling which are described later.

The procedure then goes to the second labeling so that detection of the candidate to be corrected is performed (Step S2). In the relevant process, a candidate pixel, for which the correction process as a measure against misregistration is performed, is detected from object pixels. In detail, it is determined whether the pixel, to which the label K_D is assigned in the first labeling, is the object not to be corrected or the candidate to be corrected with reference to the label information of peripheral pixels, and the label of the pixel is updated to the K_D_nonComp or the K_D_Comp in response to a result of the determination. That is, data of the label plane is rewritten.

Figure 5C:
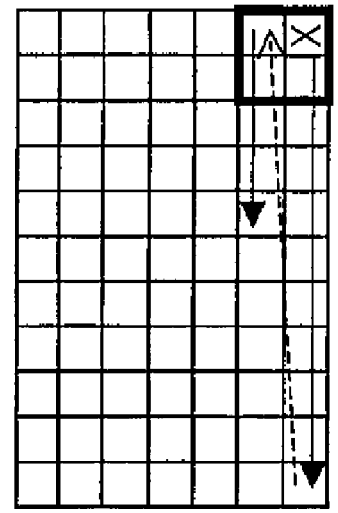
FIGS. 5A-5C are views illustrating the direction in which second labeling is performed.
Figure 5B:
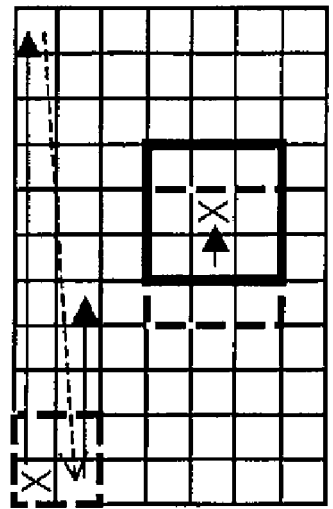
Figure 5A:
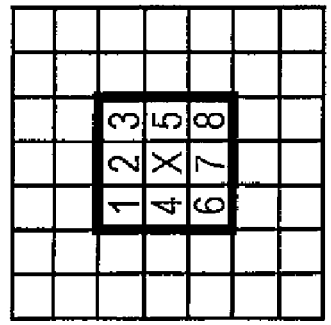

The relevant process is sequentially performed with respect to left upper pixels of the target image one by one in the forward direction and the backward direction. FIGS. 5A-5C illustrate the direction in which the relevant process is performed. FIG. 5A illustrates eight peripheral pixels (1-8) that are used to determine a pixel to be processed, that is, a target pixel X and the label thereof.

In the second labeling, after the left upper pixel of the target image is selected as the target pixel X, the process is performed using the peripheral pixels of the target pixel X. Next, the target pixel X is moved by one pixel, the process is performed in the direction indicated by an arrow in FIG. 5B, and right lower pixels of the target image are processed, so that the forward process is ended. Then, after the right lower pixel of the target image is selected as the target pixel X and the process is started again, the target pixel X is moved by one pixel, the process is performed in the direction indicated by an arrow in FIG. 5C, and the left upper pixels of the target image are processed, so that the backward process is ended. The second labeling process is performed through one-time reciprocation.

Further, in the process for each pixel, in the case in which the target pixel X is a pixel having the label K_D assigned thereto, when a pixel, which has the label K_D or K_L and the gradation value of K smaller than b (e.g., 5) with respect to the gradation value of K of the target pixel X, or a pixel, which has the label K_D_nonComp previously assigned thereto, exists in the peripheral pixels (the above-described eight peripheral pixels) of the target pixel X, the label of the target pixel X is updated to the K_D_nonComp, and the target pixel X is set as an object not to be corrected.

FIGS. 6A and 6B illustrate the relevant process. FIG. 6A illustrates a case in which the label of the target pixel X is the K_D_nonComp, and FIG. 6B illustrates a case in which the label of the target pixel X is the K_D_Comp. In FIGS. 6A and 6B, a pixel of a dark gray identical to that of the target pixel X is a pixel of the label K_D, which has the gradation value of K identical to that of the target pixel X.

Referring to the target pixel X located at the upper portion as illustrated in FIG. 6A, the peripheral pixel (8) has the label K_D or K_L and the gradation value of K smaller than b (e.g., 5) with respect to the gradation value of K of the target pixel X. In the case of the target pixel X located at the lower portion, since each pixel in the first row has the label K_D or K_L and the gradation value of K smaller than b (e.g., 5) with respect to the gradation value of K of the target pixel X, and each pixel in the second row has the label K_D_nonComp by the above-described forward process, a pixel having the label K_D_nonComp exists in the peripheral pixels, so that the label of the target pixel X is the K_D_nonComp.

FIG. 6B illustrates a case in which all peripheral pixels have the label K_D and the gradation value of K identical to that of the target pixel X in the sequence of the left upper, the right upper, the left lower and the right lower, a case in which the peripheral pixel located at the right lower portion has the label K_D or K_L and the gradation value of K equal to or higher than b with respect to the gradation value of K of the target pixel X, a case in which the peripheral pixel located at the right lower portion has the label W, and a case in which the peripheral pixel located at the right lower portion has the label M. Since all cases do not satisfy the condition of the above-described object not to be corrected, the label of the target pixel X is updated to the K_D_Comp.

FIGS. 7A and 7B illustrate the necessity of the above-described reciprocation process. Referring to the example of FIGS. 7A and 7B, in the target range of a (5×5) pixel, all pixels in the four rows located at the upper portion have the same gradation value of K and the label K_D, and all pixels in the lowest row have the label K_D and the gradation value of K smaller than b (e.g., 5) with respect to the gradation value of K of the above upper pixels.

FIG. 7A illustrates a state of a label at the time point at which the forward process is ended. In relation to pixels in the upper 3 rows, since a pixel determined as an object not to be corrected appears in peripheral pixels through the above-described process, the label K_D_Comp is assigned. However, since the target range of the (5×5) pixel corresponds to a region where the density of K varies little by little in the region (region having only the color of K) of monochromatic K, the labels of pixels included in the range should be the K_D_nonComp as described above. Thus, it can be understood that a preferable result cannot be obtained by only the forward process.

FIG. 7B illustrates a state of a label at the time point at which the reciprocation process in the forward direction and the backward direction is ended. The labels of all pixels included in the target range of the (×5) pixel are the K_D_nonComp, so that a preferable result is obtained. In the second process in the backward direction, even if any pixel is processed, the K_D_nonComp appears in the peripheral pixels thereof, so that the label K_D_nonComp is assigned to all pixels.

Figure 8:
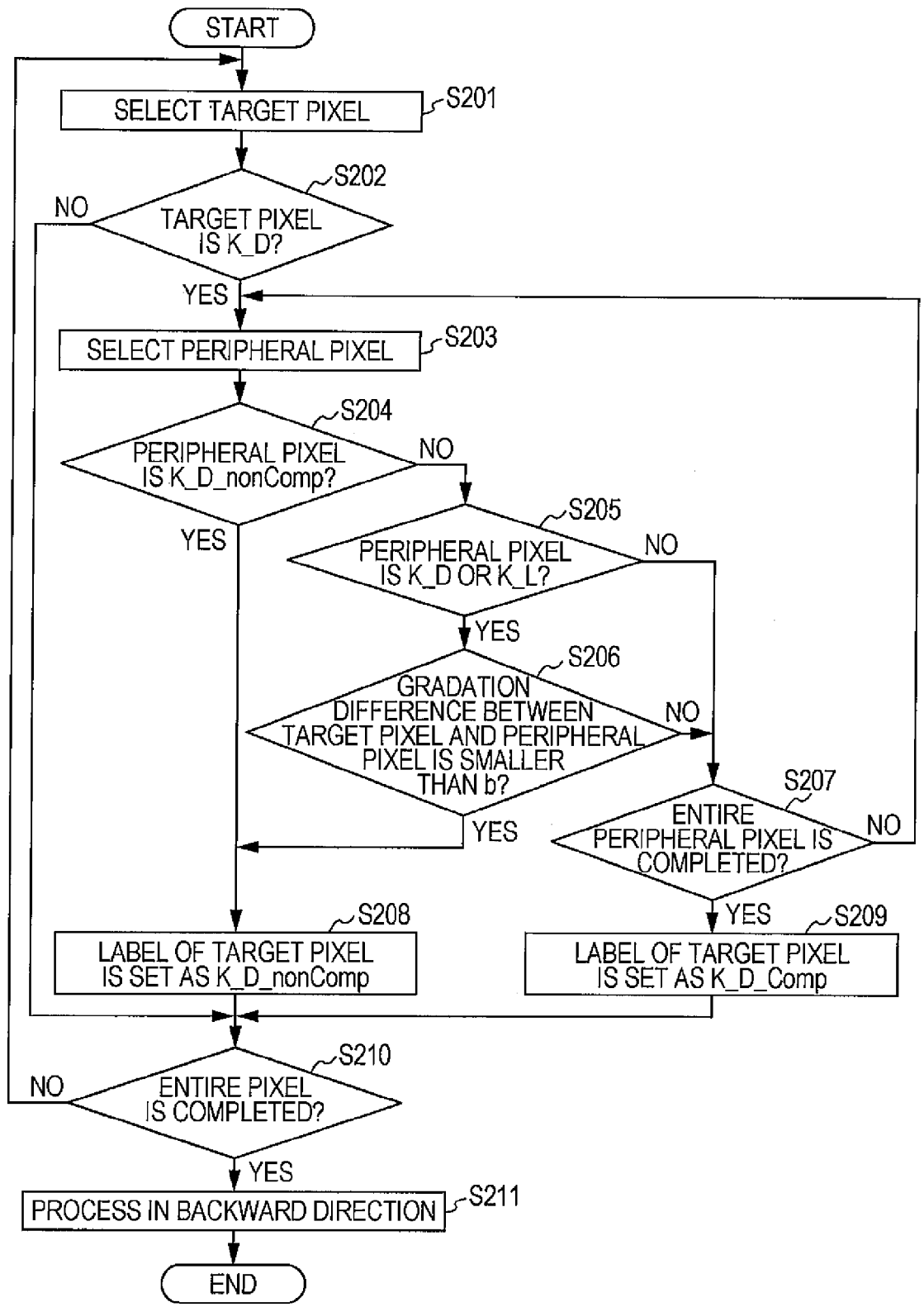
FIG. 8 is a flowchart of a second labeling process.

FIG. 8 is a flowchart of the second labeling process. As described above, the left upper pixel of the target image is first selected as the target pixel (Step S201), and it is checked whether the label of the target pixel at that time is the K_D with reference to the label plane (Step S202). As a result of the checking, when the label of the target pixel is not the K_D (No in Step S202), the process for the target pixel is ended. Then, the process for the next pixel in the forward direction goes to Step S201 in the case of "No" in Step S210.

Meanwhile, when the label of the target pixel is the K_D (Yes in Step S202), one peripheral pixel is selected (Step S203), and it is checked whether the label of the peripheral pixel at that time is the K_D_nonComp with reference to the label plane (Step S204). As a result of the checking, when the label of the peripheral pixel is the K_D_nonComp (Yes in Step S204), the label of the target pixel is updated to the K_D_nonComp (Step S208), the process for the target pixel is ended. Then, the process for the next pixel in the forward direction goes to Step S201 in the case of "No" in Step S210.

Meanwhile, when the label of the peripheral pixel is not the K_D_nonComp (No in Step S204), it is checked whether the label of the peripheral pixel is the K_D or K_L (Step S205). When the label of the peripheral pixel is the K_D or K_L (Yes in Step S205), it is checked whether the difference between the gradation value of the peripheral pixel and the gradation value of the target pixel is smaller than "b" with reference to the K plane (Step S206). If the condition is satisfied (Yes in Step S206), the label of the target pixel is updated to the K_D_nonComp (Step S208), the process for the target pixel is ended. Then, the process for the next pixel in the forward direction goes to Step S201 in the case of "No" in Step S210.

Meanwhile, when the label of the peripheral pixel is not the K_D or K_L (No in Step S205) and the condition of Step S206 is not satisfied (No in Step S206), the process for the next peripheral pixel is performed in the forward direction (No in Step S207, S203). After the same process is repeated from Step S203, when the process for all peripheral pixels (eight in the above description) is ended without performing Step S208 (Yes in Step S207), the label of the target pixel is updated to the K_D_Comp (Step S209), the process for the target pixel is ended. Then, the process for the next pixel in the forward direction goes to Step S201 in the case of "No" in Step S210.

Figure 9:
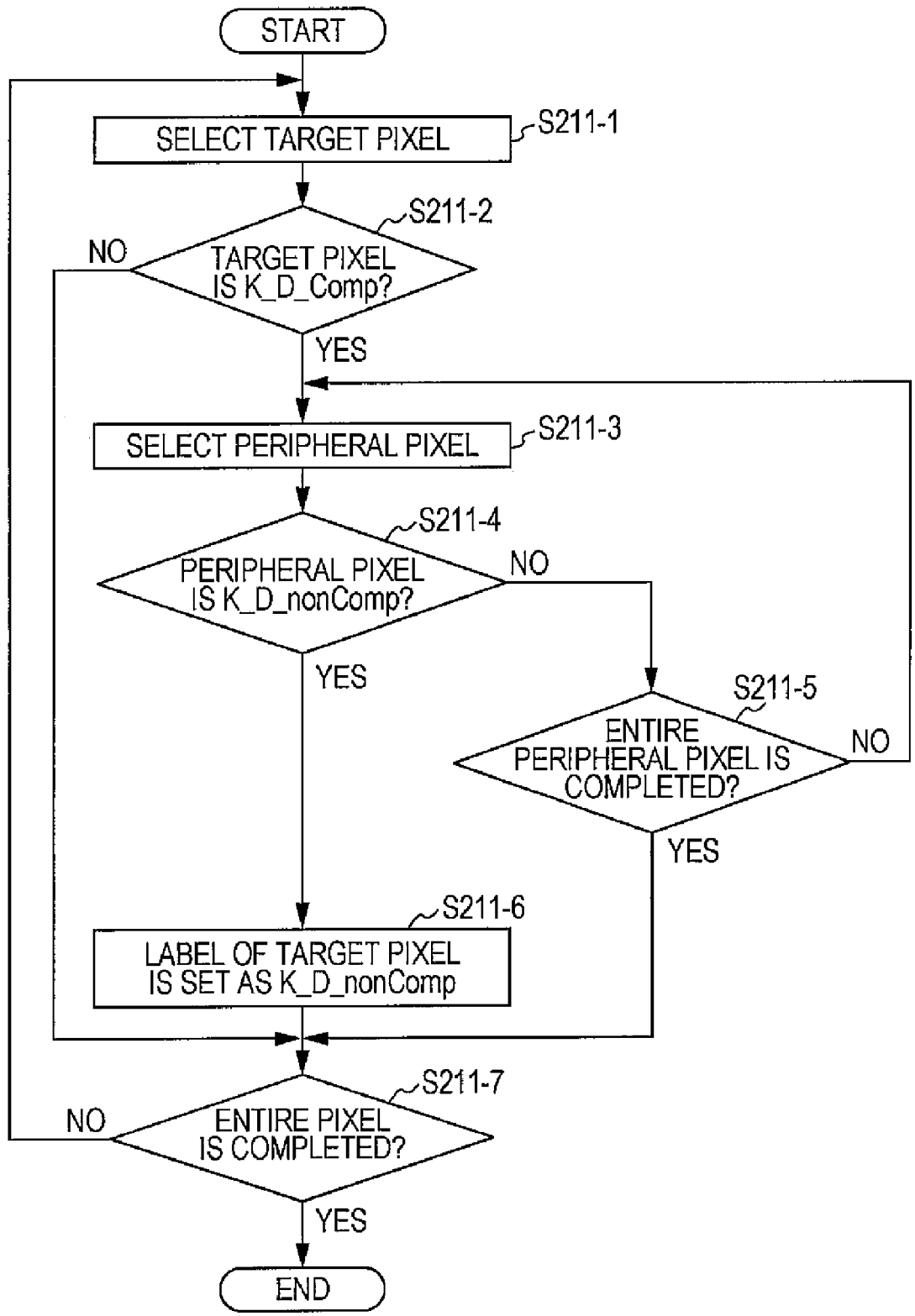
FIG. 9 is a flowchart of a backward process in second labeling.

In this manner, if the process for all pixels in the forward direction is ended (Yes in Step S210), the above-described backward process is performed (Step S211). FIG. 9 is a flowchart of the backward process.

First, the right lower pixel of the target image is selected as the target pixel (Step S211-1), and it is checked whether the label of the target pixel at that time is the K_D_Comp with reference to the label plane (Step S211-2). As a result of the checking, when the label of the target pixel is not the K_D_Comp (No in Step S211-2), the process for the target pixel is ended. Then, the process for the next pixel in the backward direction goes to Step S211-1 in the case of "No" in Step S211-7.

Meanwhile, when the label of the target pixel is the K_D_Comp (Yes in Step S211-2), one peripheral pixel is selected (Step S211-3), and it is checked whether the label of the peripheral pixel at that time is the K_D_nonComp with reference to the label plane (Step S211-4). As a result of the checking, when the label of the peripheral pixel is the K_D_nonComp (Yes in Step S211-4), the label of the target pixel is updated to the K_D_nonComp (Step S211-6), the process for the target pixel is ended. Then, the process for the next pixel in the backward direction goes to Step S211-1 in the case of "No" in Step S211-7.

Meanwhile, when the label of the peripheral pixel is not the K_D_nonComp (No in Step S211-4), the process for the next peripheral pixel is performed (No in Step S211-5, S211-3). Further, after the same process is repeated from Step S211-3, when the process for all peripheral pixels is ended without performing Step S211-6 (Yes in Step S211-5), the process for the target pixel is ended. Then, the process for the next pixel in the backward direction goes to Step S211-1 in the case of "No" in Step S211-7.

In this manner, if the process for all pixels in the backward direction is ended (Yes in Step S211-7), the backward process is ended, so that the second labeling process (S2) is ended.

As described above, the second labeling process is performed, so that the label of the pixel having the label K_D through the first labeling is updated to the K_D_nonComp or K_D_Comp, and thus the pixel having the updated label K_D_Comp becomes a candidate to be corrected. In other words, the second labeling process is performed, so that the region, where variation of density such as gradation occurs, is excluded from the region of the "Monochromatic K Dark", which is an object to be corrected for preventing the above-described void.

Thereafter, the third labeling process is performed (Step S3 of FIG. 3). In the third labeling process, the final detection of an object to be corrected and the assignment of information on an adjacent color are performed using the label plane information. Similarly to the second labeling, in the third labeling, the process for the target pixel is performed using the label information of the eight peripheral pixels, and the target pixel is moved for each pixel and the process is performed. Further, in the third labeling process, a reciprocation process in the forward direction and the backward direction is performed. In detail, four process methods are provided and any one of the first to fourth methods which are described below can be used.

According to the first method, when a target pixel has labels W, C, M and Y, color information thereof is transferred to the peripheral pixels of a candidate to be corrected, so that the labels of the peripheral pixels are updated. Further, the transfer of the information of W is limited to the range of a predetermined distance (e.g., five pixels) from the pixel having the label "W". As described above, the pixel having the label W is excluded from an object to be corrected. Thus, the transfer of the information of W is limited, so that only the predetermined range adjacent to the region of "White" can be prevented from being corrected.

Figure 10:
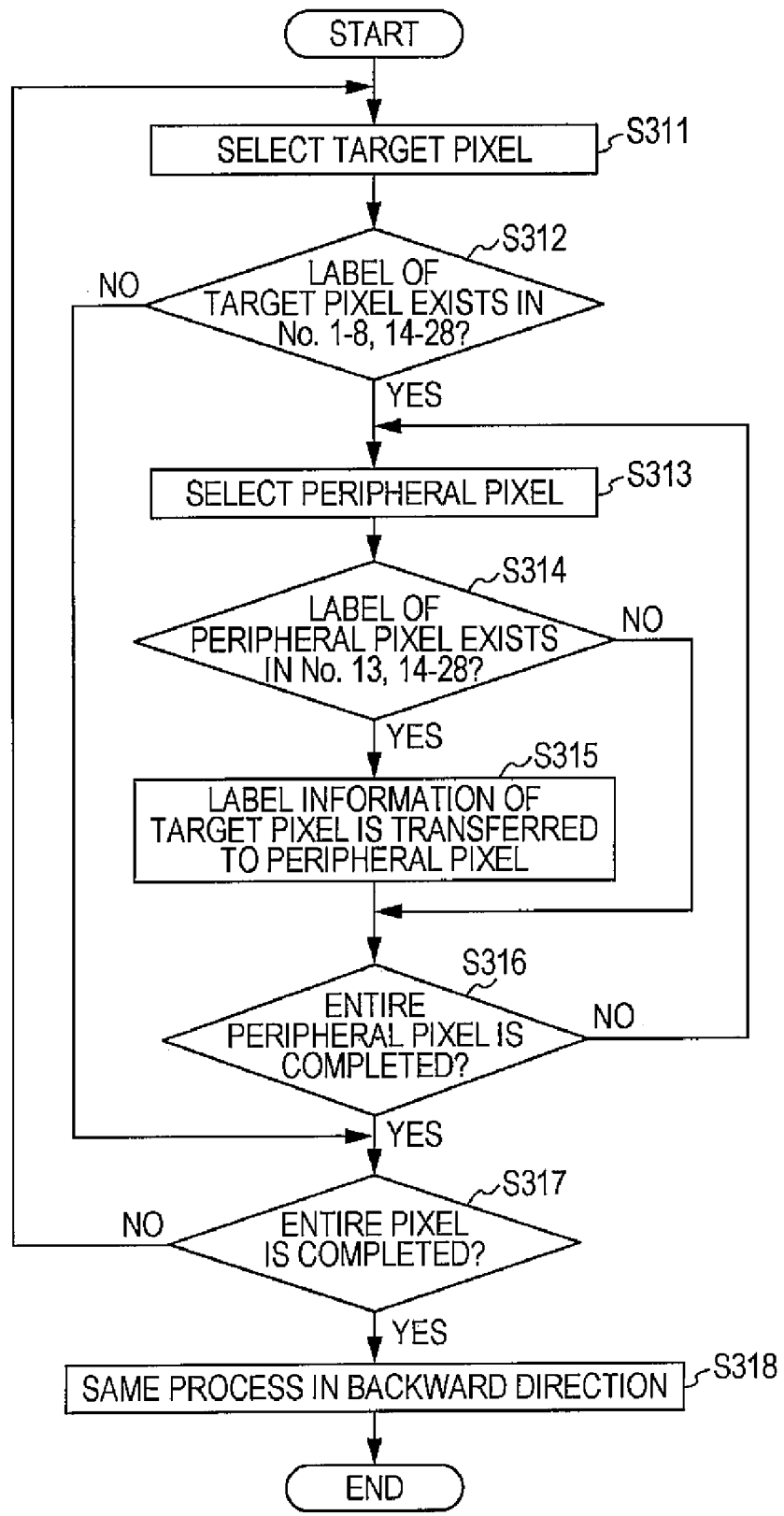
FIG. 10 is a flowchart of a third labeling process according to a first method.

FIG. 10 is a flowchart of the third labeling process according to the first method. According to the first method, first, the left upper pixel of a target image is selected as a target pixel (Step S311), and it is checked whether the label of the target pixel at that time exists in Nos. 1-8 and 14-28 as illustrated in FIG. 2 with reference to the label plane (Step S312). That is, it is checked whether the label of the target pixel corresponds to W, C, M or Y as color information. As a result of the checking, when the label of the target pixel does not exist in Nos. 1-8 and 14-28 (No in Step S312), the process for the target pixel is ended. Then, the process for, the next pixel is performed in the forward direction (No in Step S317, S311).

Meanwhile, when the label of the target pixel exists in Nos. 1-8 and 14-28 (Yes in Step S312), one peripheral pixel is selected (Step S313), and it is checked whether the label of the peripheral pixel at that time exists in Nos. 13 and 14 to 28 as illustrated in FIG. 2 with reference to the label plane (Step S314). That is, it is checked whether the peripheral pixel is a candidate to be corrected. As a result of the checking, when the label of the peripheral pixel exists in Nos. 13 and 14 to 28 (Yes in Step S314), the label information of the target pixel is transferred to the peripheral pixel (Step S315).

For example, when the label of a target pixel is the C and the label of a peripheral pixel is the K_D_Comp, the color information of the C is transferred, so that the label of the peripheral pixel is updated to the Comp_C. Further, when the label of a peripheral pixel is the Comp_M, the label of the peripheral pixel is updated to the Comp_CM. In addition, when the label of a target pixel is the Comp_Y and the label of a peripheral pixel is the Comp_M, the color information of the Y is transferred, so that the label of the peripheral pixel is updated to the Comp_MY. Similarly, even in other cases, information of a color, which is not provided to a peripheral pixel, is transferred to the peripheral pixel, so that the label of the peripheral pixel is changed to a label including the color.

When the transferred color is W, the color information of the W is transferred only to pixels existing in the range of five pixels from the pixel having the label "W" as described above. Herein, in order to allow the range (distance) to be understood, distance information from the pixel having the label "W" is also transferred thereto. FIGS. 11A-11C illustrate the transfer related to the W.

FIGS. 11A-11C illustrate an example in which the region (gray section) of the "Monochromatic K Dark" is in contact with the region (white section) of the "White". As illustrated in FIG. 11A, pixels (having small rectangular shapes) existing in the region of the "White" has the label W. Further, among pixels (having small rectangular shapes) existing in the region of the "Monochromatic K Dark", pixels existing within the range of five pixels from the region of the "White" have the label Comp_W together with information on the shortest distance from the region of the "White". Since the information of the W is not transferred to pixels which do not exist in the range of the five pixels from the region of the "White", the pixels have the label K_D_Comp.

FIG. 11B illustrates the four left upper pixels in FIG. 11A. Herein, when a target pixel is the left upper pixel, the label of a right lower peripheral pixel is updated from the K_D_Comp to Comp_W (1). In this way, when the label of a target pixel is "W", the distance information of a peripheral pixel which is a candidate to be corrected is set as (1).

FIG. 11C illustrates the nine left upper pixels in FIG. 11A. Herein, when a target pixel is the center pixel, the label of a right lower peripheral pixel is updated from the K_D_Comp to Comp_W (2). In this way, when the label of a target pixel is Comp_W, the distance information of a peripheral pixel having the label K_D_Comp is set as (distance information of the target pixel+1). Further, in the case in which the label of the peripheral pixel is also the Comp_W, when the distance information of the target pixel is small, the distance information of the peripheral pixel is set as (distance information of the target pixel+1). Further, in the case in which the label of the peripheral pixel is not the Comp_W, the distance information of the peripheral pixel is not updated.

If the transfer of information is performed and the label data of the label plane is updated, the process for the next peripheral pixel goes to S313 in the case of "No" in Step S316. Meanwhile, in Step S314, when the label of the peripheral pixel does not exist in Nos. 13 and 14 to 28 (No in Step S314), the process for the next peripheral pixel goes to S316.

After the same process is repeated from Step S313, when the process for all peripheral pixels (eight in the above description) is ended (Yes in Step S316), the process for the target pixel is ended. Then, the process for the next pixel is performed in the forward direction (No in Step S317, S311).

In this manner, if the process for all pixels in the forward direction is ended (Yes in Step S317), the above-described backward process is performed similarly to the forward process (Step S318).

In this way, the third labeling according to the first method is performed.

The second method is now described. According to the second method, when a target pixel has labels C, M and Y, color information thereof is transferred to the peripheral pixels of a candidate to be corrected, so that the labels of the peripheral pixels are updated. Further, the transfer of the information is limited to the range of a predetermined distance (e.g., five pixels) from the pixel having the label "C", "M" or "Y". In the second method, a section in the region of the "Monochromatic K Dark", which exists in a predetermined range from the region of the "Color", is set as an object to be corrected.

Figure 12:
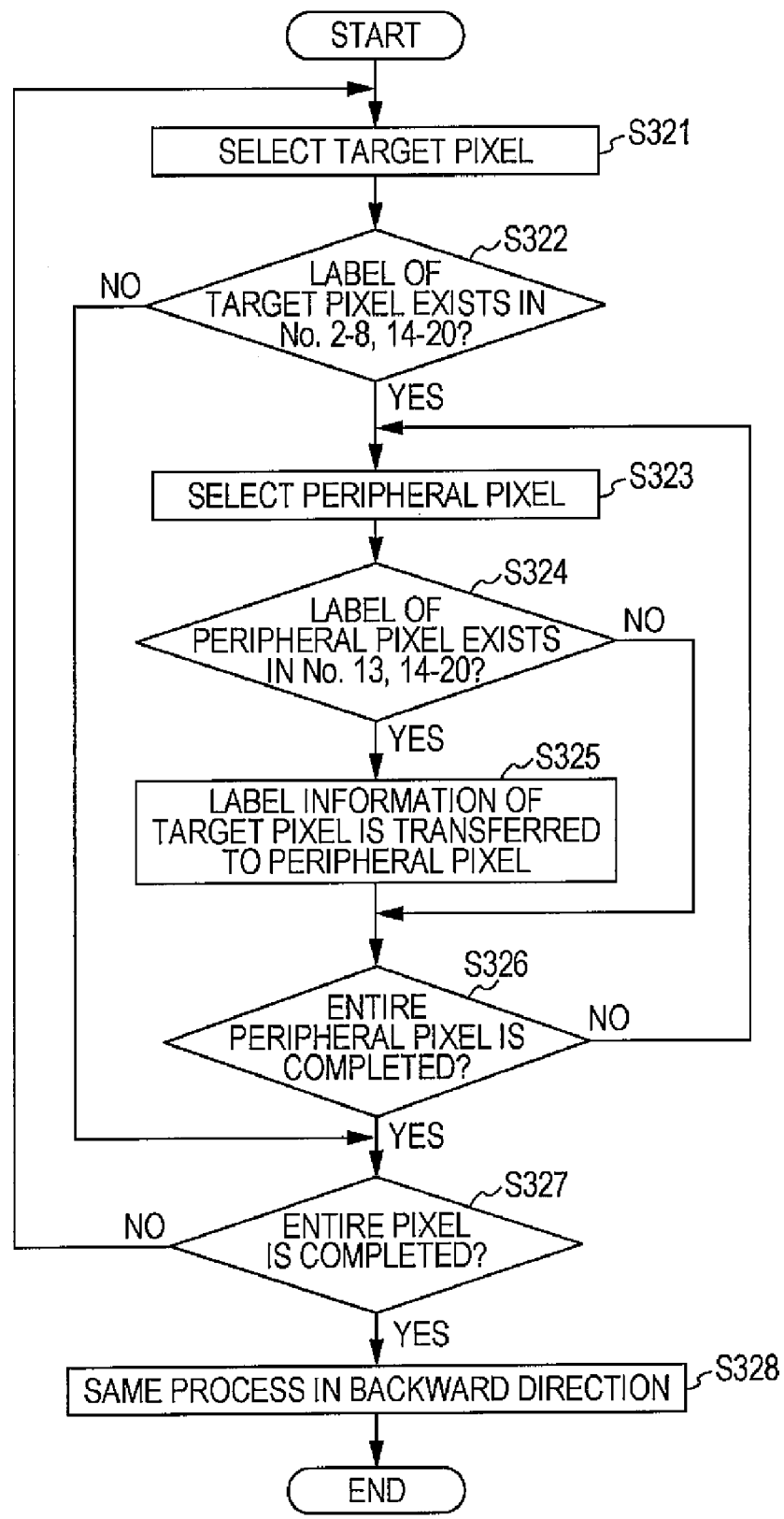
FIG. 12 is a flowchart of a third labeling process according to a second method.

FIG. 12 is a flowchart of the third labeling process according to the second method. First, the left upper pixel of a target image is selected as a target pixel (Step S321), and it is checked whether the label of the target pixel at that time exists in Nos. 2-8 and 14-20 of FIG. 2 with reference to the label plane (Step S322). That is, it is checked whether the label of the target pixel corresponds to C, M or Y as color information. As a result of the checking, when the label of the target pixel does not exist in Nos. 2-8 and 14-20 (No in Step S322), the process for the target pixel, is ended. Then, the process for the next pixel in the forward direction goes to S321 in the case of "No" in Step S327.

Meanwhile, when the label of the target pixel exists in Nos. 2-8 and 14-20 (Yes in Step S322), one peripheral pixel is selected (Step S323), and it is checked whether the label of the peripheral pixel at that time exists in Nos. 13 and 14 to 20 of FIG. 2 with reference to the label plane (Step S324). That is, it is checked whether the peripheral pixel is a candidate to be corrected. As a result of the checking, when the label of the peripheral pixel exists in Nos. 13 and 14 to 20 (Yes in Step S324), the label information of the target pixel is transferred to the peripheral pixel (Step S325).

The transfer of the color information is performed similarly to the first method. Since the color information is transferred only to pixels existing in the range of five pixels from the pixel having the label of the "Color" as described above, distance information from the pixel having the label of the "Color" is also transferred such that the range (distance) can be understood. The transfer of the distance information is also performed similarly to the first method.

If the transfer of information is performed and the label data of the label plane is updated, the process for the next peripheral pixel goes to S323 in the case of "No" in Step S326. Meanwhile, in Step S324, when the label of the peripheral pixel does not exist in Nos. 13 and 14 to 20 (No in Step S324), the process for the next peripheral pixel goes to S326.

After the same process is repeated from Step S323, when the process for all peripheral pixels (eight in the above description) is ended (Yes in Step S326), the process for the target pixel is ended. Then, the process for the next pixel in the forward direction goes to S321 in the case of "No" in Step S327.

In this manner, if the process for all pixels in the forward direction is ended (Yes in Step S327), the above-described backward process is performed similarly to the forward process (Step S328).

In this way, the third labeling according to the second method is performed.

The third method is now described. According to the third method, when a target pixel is a candidate to be corrected, color information of peripheral pixels having the labels W, C, M and Y is transferred to the target pixel, so that the label of the target pixel is updated. Further, the transfer of the information of W is limited to the range of a predetermined distance (e.g., five pixels) from the pixel having the label "W", similarly to the first method.

Figure 13:
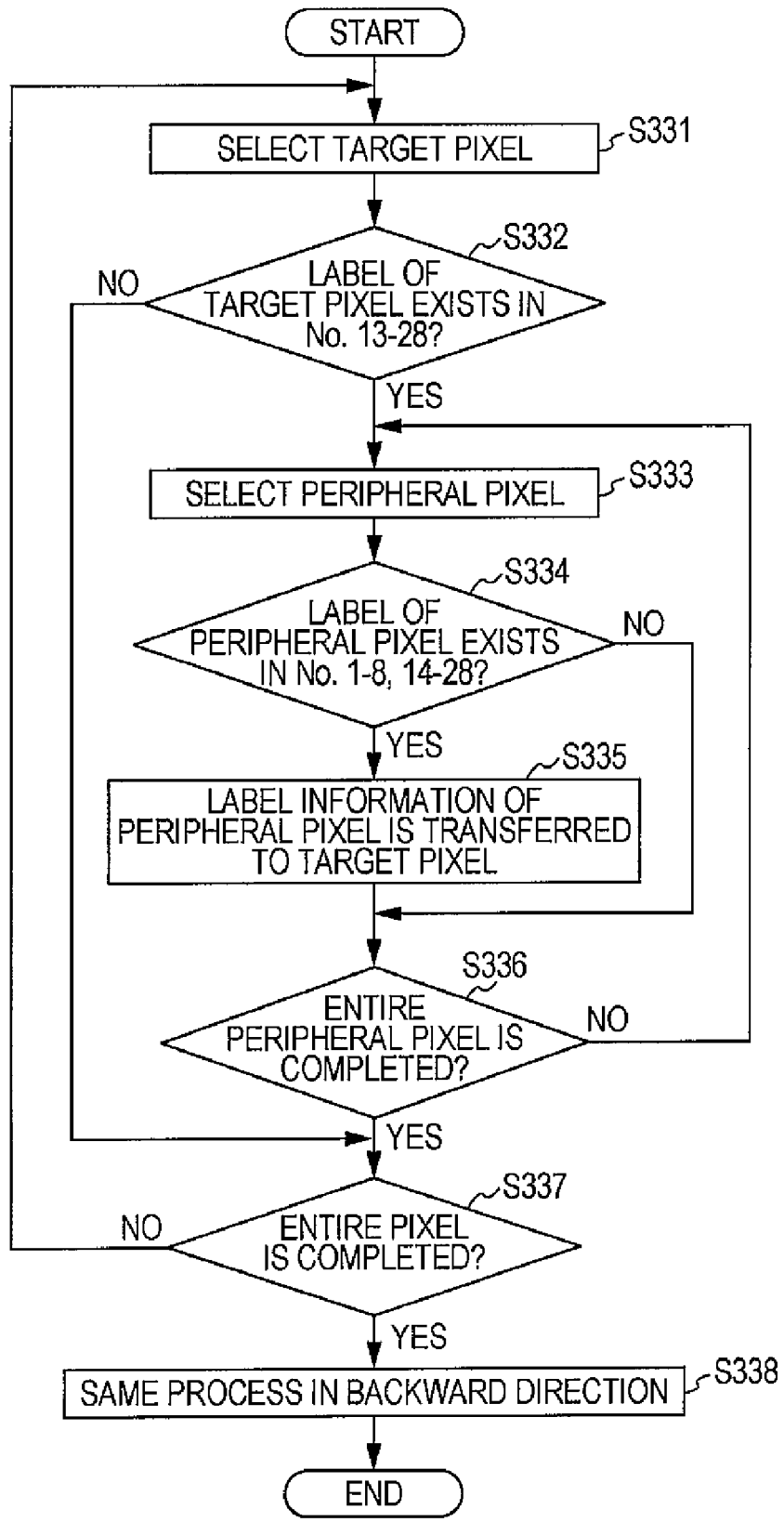
FIG. 13 is a flowchart of a third labeling process according to a third method.

FIG. 13 is a flowchart of the third labeling process according to the third method. First, the left upper pixel of a target image is selected as a target pixel (Step S331), and it is checked whether the label of the target pixel at that time exists in Nos. 13-28 of FIG. 2 with reference to the label plane (Step S332). That is, it is checked whether the target pixel is a candidate to be corrected. As a result of the checking, when the label of the target pixel does not exist in Nos. 13-28 (No in Step S332), the process for the target pixel is ended. Then, the process for the next pixel in the forward direction goes to S331 in the case of "No" in Step S337.

Meanwhile, when the label of the target pixel exists in Nos. 13-28 (Yes in Step S332), one peripheral pixel is selected (Step S333), and it is checked whether the label of the peripheral pixel at that time exists in Nos. 1-8 and 14-28 of FIG. 2 with reference to the label plane (Step S334). That is, it is checked whether the label of the peripheral pixel corresponds to W, C, M or Y as color information. As a result of the checking, when the label of the peripheral pixel exists in Nos.

1-8 and 14-28 (Yes in Step S334), the label information of the peripheral pixel is transferred to the target pixel (Step S335).

The transfer of the color information is performed similarly to the first method. Further, when the transferred color is W, the color information is transferred only to pixels existing in the range of five pixels from the pixel having the label "W" as described above. Herein, in order to allow the range (distance) to be understood, distance information from the pixel having the label "W" is also transferred thereto. FIGS. 15A-15C illustrate the transfer of information related to W.

FIGS. 15A-15C illustrate an example in which the region (gray section) of the "Monochromatic K Dark" is in contact with the region (white section) of the "White". As illustrated in FIG. 15A, pixels (having small rectangular shapes) existing in the region of the "White" have the label W. Further, among pixels (having small rectangular shapes) existing in the region of the "Monochromatic K Dark", pixels existing within the range of five pixels from the region of the "White" have the label Comp_W together with information on the shortest distance from the region of the "White". Since the information of W is not transferred to pixels which do not exist in the range of the five pixels from the region of the "White", the pixels have the label K_D_Comp.

FIG. 15B illustrates the nine left upper pixels in FIG. 15A. Herein, when a target pixel is the center pixel, since there exists a peripheral pixel having the label W, the label of the target pixel is updated to Comp_W (1). In this way; when there exists the peripheral pixel having the label "W", the distance information of the target pixel is set as (1).

FIG. 15C illustrates the nine left upper pixels in FIG. 15A. Herein, when a target pixel is the center pixel, since there exists a peripheral pixel having the label Comp_W (1), the label of the target pixel is updated to Comp_W (2). In this way, when a peripheral pixel having the label "Comp_W" exists, the distance information of the target pixel is set as (minimum value of the distance information of the peripheral pixel+1).

If the transfer of information is performed and the label data of the label plane is updated as described above, the process for the next peripheral pixel goes to S333 in the case of "No" in Step S336. Meanwhile, in Step S334, when the label of the peripheral pixel does not exist in Nos. 1-8 and 14-28 (No in Step S334), the process for the next peripheral pixel goes to S336.

After the same process is repeated from Step S333, when the process for all peripheral pixels (eight in the above description) is ended (Yes in Step S336), the process for the target pixel is ended. Then, the process for the next pixel goes to S331 in the case of "No" in Step S337.

In this manner, if the process for all pixels in the forward direction is ended (Yes in Step S337), the above-described backward process is performed similarly to the forward process (Step S338).

In this way, the third labeling according to the third method is performed.

The fourth method is now described. According to the fourth method, when a target pixel is a candidate to be corrected, color information of peripheral pixels having the labels C, M and Y is transferred to the target pixel, so that the label of the target pixel is updated. Further, the transfer of the information is limited to the range of a predetermined distance (e.g., five pixels) from the pixel having the label "C", "M" or "Y". In the fourth method, a section in the region of the "Monochromatic K Dark", which exists in a predetermined range from the region of the "Color", is set as an object to be corrected.

Figure 14:
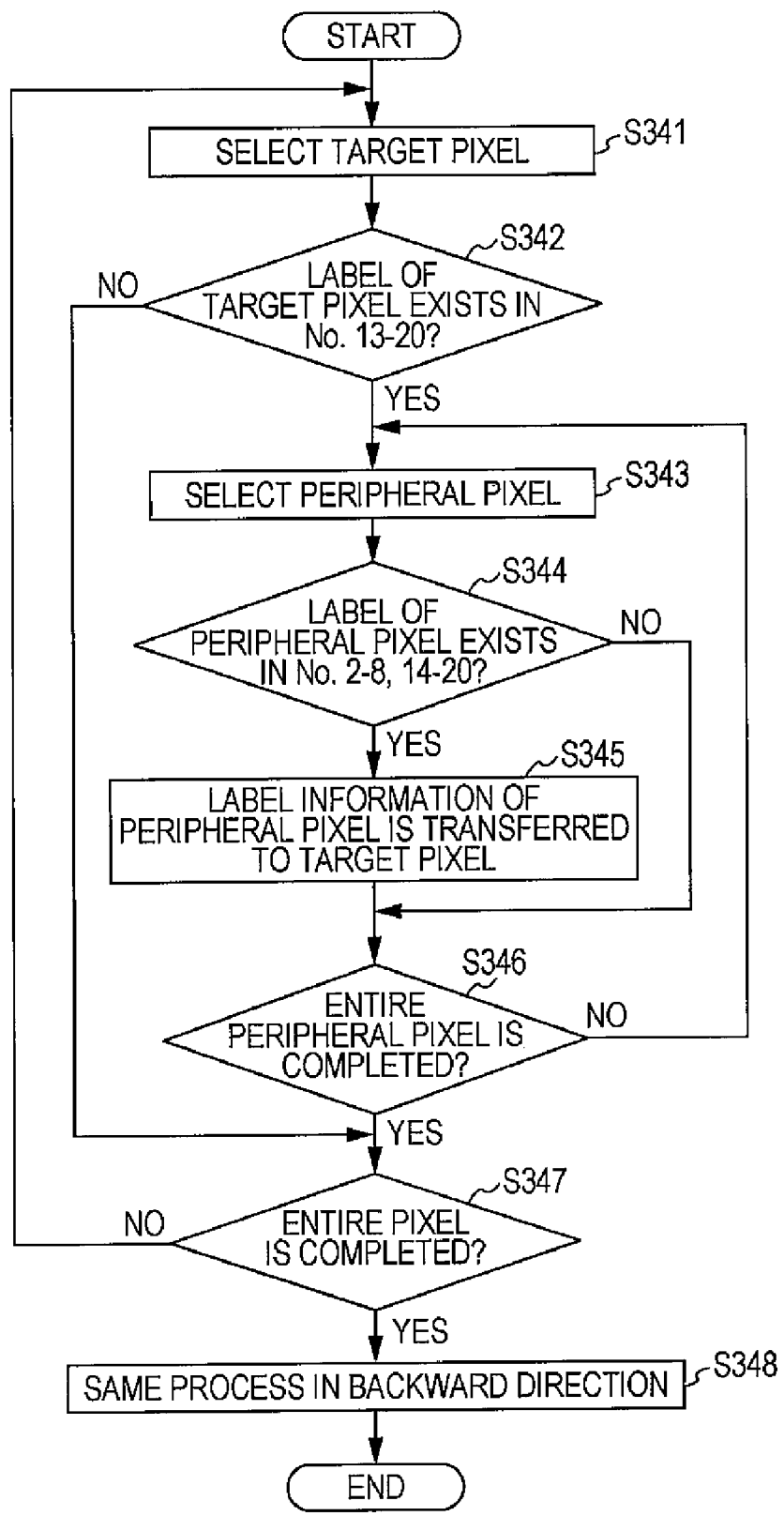
FIG. 14 is a flowchart of a third labeling process according to a fourth method.

FIG. 14 is a flowchart of the third labeling process according to the fourth method. First, the left upper pixel of a target image is selected as a target pixel (Step S341), and it is checked whether the label of the target pixel at that time exists in Nos. 13-20 of FIG. 2 with reference to the label plane (Step S342). That is, it is checked whether the target pixel is a candidate to be corrected. As a result of the checking, when the label of the target pixel does not exist in Nos. 13-20 (No in Step S342), the process for the target pixel is ended. Then, the process for the next pixel in the forward direction goes to S341 in the case of "No" in Step S347.

Meanwhile, when the label of the target pixel exists in Nos. 13-20 (Yes in Step S342), one peripheral pixel is selected (Step S343), and it is checked whether the label of the peripheral pixel at that time exists in Nos. 2-8 and 14-20 of FIG. 2 with reference to the label plane (Step S344). That is, it is checked whether the label of the peripheral pixel corresponds to C, M or Y as color information. As a result of the checking, when the label of the peripheral pixel exists in Nos. 2-8 and 14-20 (Yes in Step S344), the label information of the peripheral pixel is transferred to the target pixel (Step S345).

The transfer of the color information is performed similarly to the first method. Further, when the transferred color is W, the color information is transferred only to pixels existing in the range of five pixels from the pixel having the label of the "Color" as described above, distance information from the pixel having the label of the "Color" is also transferred such that the range (distance) can be understood. The transfer of the distance information is also performed similarly to the third method.

If the transfer of information is performed and the label data of the label plane is updated as described above, the process for the next peripheral pixel goes to S343 in the case of "No" in Step S346. Meanwhile, in Step S344, when the label of the peripheral pixel does not exist in Nos. 2-8 and 14-20 (No in Step S344), the process for the next peripheral pixel goes to S346.

After the same process is repeated from Step S343, when the process for all peripheral pixels (eight in the above description) is ended (Yes in Step S346), the process for the target pixel is ended. Then, the process for the next pixel in the forward direction goes to S341 in the case of "No" in Step S347.

In this manner, if the process for all pixels in the forward direction is ended (Yes in Step S347), the above-described backward process is performed similarly to the forward process (Step S348).

In this way, the third labeling according to the fourth method is performed.

If the third labeling process is ended as described above, since the object to be corrected is finally detected, the procedure goes to Step S4 of FIG. 3 so that the correction process is performed.

The correction process is performed based on the label information maintained in the label plane as a result of the third labeling. In detail, the bit map data of the CMYK is changed with respect to the pixels to which the label Nos. 14-20 of FIG. 2 are assigned, so that correction as a measure against misregistration is performed. In more detail, the process varies depending on a first case in which the value (black gradation value) of the K plane of a pixel to be corrected is the highest value of 255, and a second case in which the value is not the highest value. In the first case, a predetermined gradation value (e.g., 51) is added to the bit map data with respect to the color of color information of the label assigned to the pixel. In the second case, the bit map data is changed such that the color of the monochromatic K of the pixel is represented by a mixed color including colors other than a black color by using the conversion tables 30 prepared for the color of color information with the label assigned to the pixel, that is, conversion to the representation by a composite K is performed.

For example, when the label of a pixel to be corrected is the Comp_CM and the gradation value of K thereof is 255, 51 is respectively added to the gradation values of the C and the M, so that the bit map data of the pixel is corrected from (0, 0, 0, 255) to (51, 51, 0, 255) in the sequence of the CMYK.

Figure 16:
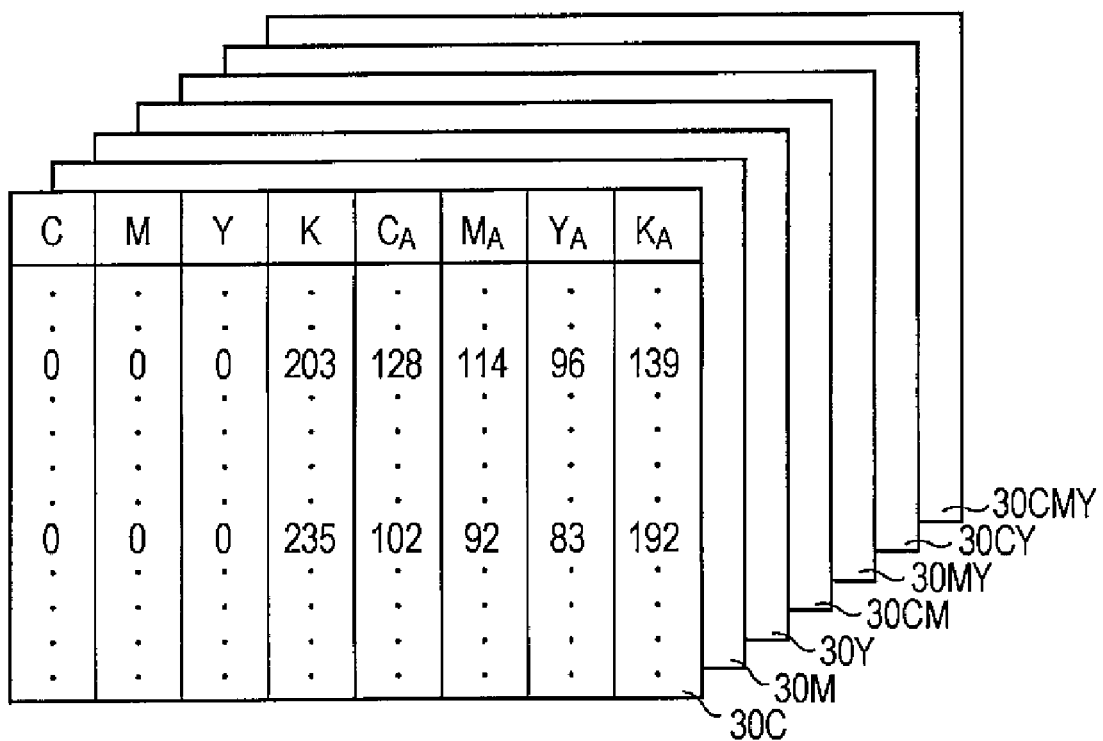
FIG. 16 is a view schematically illustrating conversion tables.

Meanwhile, in the second case in which the gradation value of the K of the pixel to be corrected is not the highest value of 255, the conversion to the representation by the composite K is performed using corresponding conversion tables 30 as described above. FIG. 16 schematically illustrates the conversion tables 30. As illustrated in FIG. 16, seven conversion tables 30 are prepared for the printer 2 according to colors of pixels adjacent to the region to be corrected. In detail, the conversion tables 30C, 30M, 30Y, 30CM, 30MY, 30CY and 30CMY are generated according to adjacent colors C, M, Y, CM, MY, CY and CMY by using methods that are described later and then are maintained in the RAM 25.

In each conversion table 30, colors of each density of the "Monochromatic K dark" are provided in association with density gradation values of CMYK colors when the colors are represented by mixed colors. For example, as illustrated in the conversion table 30C dedicated for C, the left CMYK represent colors of each density of the "Monochromatic K dark", and the right CMYK represent density gradation values of $C_A M_A Y_A K_A$ colors when the colors are represented by the mixed colors. The left CMYK have values of (0, 0, 0, K) and K is equal to or higher than "a" and is equal to or less than 255. For example, as illustrated in FIG. 16, the "Monochromatic K dark" of (0, 0, 0, 203) is set in such a manner that the "Monochromatic K dark" of (0, 0, 0, 203) is represented by the composite K in which the $C_A M_A Y_A K_A$ become (128, 114, 96, 139). Even in the case of the conversion table 30 dedicated for other colors, the representation by the composite K is set in the same manner.

Further, in the conversion table 30 dedicated for each color, density gradation values of each color are set such that gradation values of colors other than a corresponding color become small if possible in the representation by the composite K. For example, in the case of the conversion table 30C dedicated for C, the values of the $C_A M_A Y_A$ are set such that the $M_A$ and the $Y_A$ have values smaller than that of the $C_A$. In other words, a density gradation value of a target color are set to be larger than density gradation values of colors other than the target color.

The correction process is performed using the above-described conversion tables 30. As described above, since the label Nos. 14-20 of FIG. 2 are assigned to a pixel to be corrected, the pixel has one of the labels Comp_C to Comp_CMY, and a correction process including conversion to the composite K is performed with reference to the conversion table 30 corresponding to an associated part representing color information of a pixel adjacent to a region to be corrected in a corresponding label. For example, if a pixel to be corrected has the label Comp_C and the gradation value of each color of the pixel is (0, 0, 0, 203), the gradation value (128, 114, 96, 139) of each color is obtained from the result of the correction process.

As described above, correction is performed using the above-described conversion tables 30 corresponding to the pixel (region) adjacent to the region to be corrected of the "Monochromatic K dark", so that the amount (gradation values) of colors other than the color of the adjacent pixel (region), among colors other than the K assigned to the region of the "Monochromatic K dark", is small. Thus, when misregistration has occurred, density in the vicinity of the adjacent region is reduced, so that the association of colors from the adjacent region can be prevented from being broken and degradation of image quality can be prevented through the measure against misregistration.

The generation of the conversion tables 30 dedicated for each color is now described. First, prior to shipping of the printer 2, basic tables, which are conversion tables for a printer serving as a reference, are created by a manufacturer. In detail, seven basic tables becoming the origin of the conversion tables 30 are generated as corresponding tables identical to the conversion tables 30. That is, corresponding tables of (0, 0, 0, K)-($C_B M_B Y_B K_B$), in which colors of each density of the "Monochromatic K dark" correspond to density gradation values of CMYK colors when the colors are represented by mixed colors, are generated for colors C, M, Y, CM, MY, CY and CMY.

First, after patch sheets, on which patches of the density values of the colors "CMYK" have been printed, are output from the reference printer, colorimetry is performed for the output result to obtain Lab values of each patch. Next, based on the result thereof, a color conversion table to the Lab is generated from the CMYK of the reference printer. According to the table, each color represented by the CMYK corresponds to the Lab values thereof.

Then, for each basic table of each color, the values of the ($C_B M_B Y_B K_B$) corresponding to the (0, 0, 0, K), that is, representation by the composite K is determined by selecting CMYK values that satisfy the conditions below in the generated color version tables. The selection can be performed by the operation of the computer system according to the program for the process.

According to the condition (1), the gradation value of a target color is equal to or larger than 20% of the maximum density value. Herein, since the gradation value is represented by 256 gradations from 0-255, the condition is that the gradation value is equal to or larger than 51. Thus, when the basic table for the C is generated, CMYK representation in which the gradation value of the C is equal to or larger than 51 is selected from the color version table. Further, in the case of the basic table for CM, CMYK representation in which the gradation value of C is equal to or larger than 51 and the gradation value of M is equal to or larger than 51 is selected.

According to the condition (2), the $K_B$ value is equal to or less than the gradation value of K of the (0, 0, 0, K). Thus, CMYK representation, in which the above condition is satisfied, is selected from the color conversion table.

The condition (3) denotes a color located adjacent to an L axis of a Lab 3-dimension space in corresponding Lab representation. This denotes that a K axis is near the axis in the CMYK representation. Thus, CMYK representation, in which values "a" and "b" are smaller than a predetermined value (a relative small value which is near the L axis), is selected.

The condition (4) denotes a color which is near an L value of Lab representation which corresponds to the (0, 0, 0, K) in the color conversion table. This is for equalizing brightness. Thus, CMYK representation, in which an L value nearing the L value corresponds, is selected.

According to the condition (5), the total amount in the CMYK representation ($C_B M_B Y_B K_B$) is equal to or less than a value in the regulation of hardware. That is, the total amount does not exceed the maximum amount that can be coated in terms of the mechanism of the printer. Thus, CMYK representation, in which the above condition is satisfied, is selected.

When two or more CMYK representations completely satisfying the above-described five conditions are selected by the program, one of the CMYK representations is selected using the following conditions.

According to the condition (6), the total amount of (gradation values) of $C_B M_B Y_B$ is the smallest. According to the condition (7), a value of a color of any one of $C_B M_B Y_B$ is the smallest. According to the condition (8), representation of $C_B M_B Y_B$ is the nearest to the L axis. According to the condition (9), the L value is the nearest in representation of $C_B M_B Y_B$. According to the condition (10), a hue angle is the nearest to the K axis in representation of $C_B M_B Y_B$. According to the condition (11), the $K_B$ has the maximum value.

The selection process is ended at the time point at which one $C_B M_B Y_B K_B$ is determined by sequentially applying the above additional conditions. The application sequence of the conditions (6)-(11) may be changed.

If the basic tables for each color are generated as described above, the basic tables are stored in the ROM 26 for shipment.

Thereafter, in the printer 2, the above-described conversion tables 30 are generated at a predetermined timing based on the basic tables. Herein, the predetermined timing is a timing at which colorimetry is performed with respect to colors output from the printer 2, and includes the time at which power is supplied thereto, consumption articles are exchanged, printing of a predetermined number of sheets is performed or the like.

If the above-described predetermined timing is reached, the CPU 24 of the controller 21 performs a process according to the program for generating the conversion tables 30 stored in the ROM 26 and stores the generated seven conversion tables 30 in the RAM 25.

According to the conversion table generation process, the conversion tables 30 below are generated based on the basic tables, the maximum density values (in the CMYK, respective $D_{BC} D_{BM} D_{BY} D_{BK}$) of each color of the reference printer, and the maximum density values (in the CMYK, respective $D_{AC} D_{AM} D_{AY} D_{AK}$) of each color of the printer 2.

Further, the maximum density value used for the process denotes density that is actually output when the density gradation values of each color are set to 255 (maximum value). In relation to the reference printer, a value color-measured in advance is stored in the ROM 26. In relation to the printer 2, a value color-measured at the above-described predetermined timing is used.

Further, the conversion tables 30 of each color are generated by correcting the values of $C_B M_B Y_B K_B$ with respect to the basic tables for the same color in correspondence with the density characteristics (maximum density value) of the body of the printer 2. In detail, the values of $(C_A M_A Y_A K_A)$ corresponding to each (0, 0, 0, K) of each conversion table 30 are determined using Equations (1)-(4) below.

$$K_A = K + (D_{BK}/D_{AK}) \times (K_B - K) \quad (1)$$

$$C_A = (D_{BC}/D_{AC}) \times C_B \quad (2)$$

$$M_A = (D_{BM}/D_{AM}) \times M_B \quad (3)$$

$$Y_A = (D_{BY}/D_{AY}) \times Y_B \quad (4)$$

In this manner, the values of each $(C_A M_A Y_A K_A)$ with respect to each (0, 0, 0, K) of each conversion table 30 are determined. However, when the determined values are smaller than 51 (20% of the maximum value) with respect to the gradation value of a target color, the values are changed to 51 and gradation values of other colors are also changed in accordance with such change. In the conversion table 30C for C, when the value of $C_A$ is smaller than 51, $C_A$ is raised to 51 and values of $M_A Y_A K_A$ are also changed.

In detail, when $C_A$ is raised to 51, the values of $M_A Y_A K_A$ are calculated after the change by using Equations (5)-(8) below.

$$P = 51/C_A \; (C_A \text{ calculated in Equation (2)}) \quad (5)$$

$$K_A = K + P \times (D_{BK}/D_{AK}) \times (K_B - K) \quad (6)$$

$$M_A = P \times (D_{BM}/D_{AM}) \times M_B \quad (7)$$

$$Y_A = P \times (D_{BY}/D_{AY}) \times Y_B \quad (8)$$

Even in the case of the conversion table 30 for other colors, when the value of a corresponding color is smaller than 51, the same change process is performed.

As described above, each conversion table 30 is generated and maintained. Herein, since gradation values of each color are determined using Equations (1)-(4) above such that actual density variation of each color when the monochromatic K is represented by the composite K is to be the same as that in the case of the reference printer, appropriate representation by the composite K is possible in the case of the printer 2. Further, through the process using Equations (5)-(8), the minimum gradation value of a target color is ensured, so that a void can be prevented from occurring and the balance of a color can be maintained.

As described above, the conversion tables 30 for each color are automatically generated for each body from the calorimetric result of the body based an the basic tables.

Figure 17A:
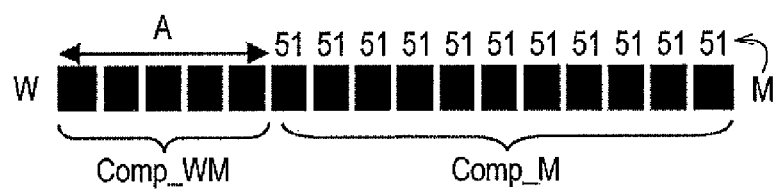
FIGS. 17A-17D are views illustrating the content of a correction process.

As described above, a correction process as a measure against misregistration is performed. FIGS. 17A-17D illustrate the result of the correction process. FIGS. 17A-17D illustrate a case in which the above-described third labeling is performed using the first method and the third method. FIG. 17A illustrates a case in which 16 pixels represented by a monochromatic K and having a gradation value (255, black) of K are arranged in a row while being in contact with pixels having the label "W" at the left end thereof and pixels having the label "M" at the right end thereof. In such a case, through the above-described third labeling process, the right 11 pixels have the label Comp_M and the left five pixels indicated by A in FIG. 17A have the label Comp_WM. Further, based on the above-described correction process, the gradation value of M is increased by 51 with respect to the pixels having the label Comp_M, and the pixels having the label Comp_WM are not corrected.

Figure 17B:
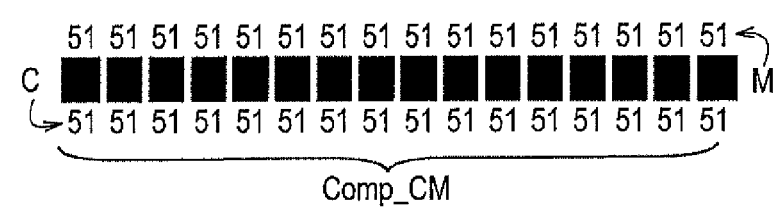

FIG. 17B illustrates a case in which 16 pixels represented by a monochromatic K and having a gradation value (255, black) of K are arranged in a row while in contact with pixels having the label "C" at the left end thereof and pixels having the label "M" at the right end thereof, similarly to the case of FIG. 17A. In such a case, all pixels have the label Comp_CM through the above-described third labeling process, and the gradation values of C and M are increased by 51 based on the above-described correction process.

Figure 17C:
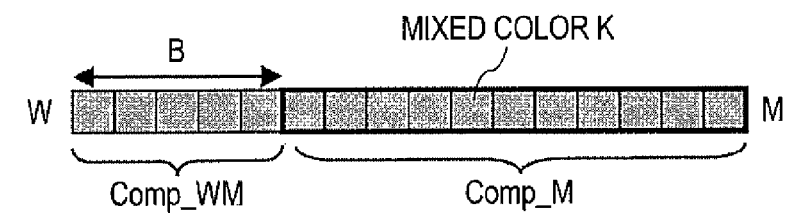

FIG. 17C illustrates a case in which 16 pixels represented by a monochromatic K and having a gradation value (other than 255, gray color) of K are arranged in a row while in contact with pixels having the label "W" at the left end thereof and pixels having the label "M" at the right end thereof. In such a case, through the above-described third labeling process, the right 11 pixels have the label Comp_M and the left five pixels indicated by B in FIG. 17C have the label Comp_WM. Further, based on the above-described correction process, the pixels having the label Comp_M are represented by the composite K, and the pixels having the label Comp_WM are not corrected.

Figure 17D:
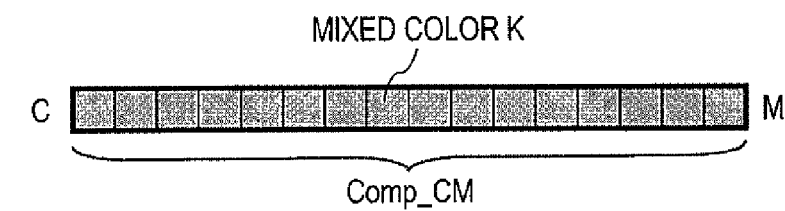

FIG. 17D illustrates a case in which 16 pixels represented by a monochromatic K and having a gradation value (other than 255, gray color) of K are arranged in a row while in contact with pixels having the label "C" at the left end thereof and pixels having the label "M" at the right end thereof, similarly to the case of FIG. 17C. In such a case, all pixels have the label Comp_CM through the above-described third labeling process, and all pixels are represented by the composite K based on the above-described correction process.

Figure 18A:
FIGS. 18A-18D are views illustrating the content of a correction process.

FIGS. 18A-18D illustrate the result of the correction process. FIGS. 18A-18D illustrate a case in which the above-described third labeling is performed using the second method and the fourth method. FIG. 18A illustrates the state of pixels identical to the case of FIG. 17A, except that only the right five pixels are corrected so that they have the label Comp_M through the above-described third labeling process, and the gradation value of the M is increased by 51 with respect to the pixels having the label Comp_M based on the above-described correction process.

Figure 18B:

FIG. 18B illustrates the state of pixels identical to the case of FIG. 17B, except that only the left five pixels and only the right five pixels are corrected so that the left five pixels have the label Comp_C and the right five pixels have the label Comp_M through the above-described third labeling process, and the gradation value of M is increased by 51 with respect to the pixels having the label Comp_M and the gradation value of C is increased by 51 with respect to the pixels having the label Comp_C based on the above-described correction process.

Figure 18C:
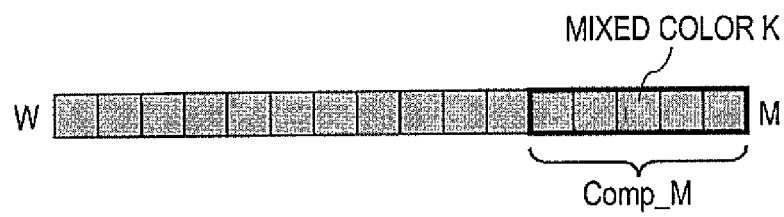

FIG. 18C illustrates the state of pixels identical to the case of FIG. 17C, except that only the right five pixels are corrected so that they have the label Comp_M through the above-described third labeling process, and they are represented by the composite K based on the above-described correction process.

Figure 18D:
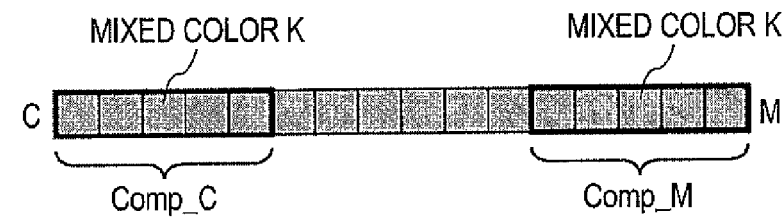

FIG. 18D illustrates the state of pixels identical to the case of FIG. 17D, except that only the left five pixels and only the right five pixels are corrected so that the left five pixels have the label Comp_C and the right five pixels have the label Comp_M through the above-described third labeling process, and the left five pixels and the right five pixels are represented by the composite K based on the above-described correction process.

Further, according to the correction as described above, when an object to be corrected is a black color (gradation value thereof is 255), gradation values of each color are uniformly increased (herein, 51). However, the increase amount may vary depending on the position of a pixel to be corrected. For example, the increase amount can be set as 51 at maximum with respect to a pixel in contact with a pixel having the label "Color", and the increase amount can be reduced with the increase in distance from the pixel having the label "Color".

In this way, the correction process is performed, so that correction as a measure against misregistration by the printer 2 is completed.

Through the process, the region of the "Monochromatic K Dark" in contact with the region of the "Color" is corrected, so that the printing process is performed using the corrected bit map data as described above, thereby effectively preventing a void from occurring in the vicinity of characters or the like.

According to the above description, the generation process of the label data is performed through three stages from the first labeling to the third labeling. However, after the first to third labeling are incorporated, a one-time reciprocation process in the forward direction and backward direction for each pixel as described above can be applied.

As described above, in the printer 2 according to the embodiment, since an object to be corrected is determined in pixel units, each pixel is allowed to have label information, and the information is transferred to peripheral pixels so that an object to be corrected and the content of correction are decided, the correction process as a measure against misregistration can be reliably and efficiently performed. Further, since the transferred label information includes color information of a region being in contact with a region to be corrected, suitable and useful correction can be performed. In addition, since the transferred label information includes distance information from the region being in contact with the region to be corrected, a correction range can be specified only in a more suitable region and efficient correction is possible.

Further, when a region to be corrected is not the maximum density of a block, correction is performed such that representation by a mixed color is executed using a conversion table 30 generated corresponding to a color adjacent to the region, so that an inappropriate color can be prevented from appearing in the vicinity of the region when misregistration has occurred. Thus, a measure against misregistration capable of preventing degradation of image quality is possible. In addition, since the conversion tables 30 for each color are automatically generated from the above-described basic tables in correspondence with the characteristics of the body, it is unnecessary to design in advance them for the body of the printer 2, and time necessary for table design can be reduced.

Moreover, in the labeling processes performed in the three stages, since it is simply required to access only to the label plane, the processes can be efficiently performed.

Further, when a dark gray pixel having only the color of K and a gradation value equal to or larger than a predetermined value is selected as a candidate to be corrected, and a pixel having only the color of K and a gradation value slightly different from that of the relevant pixel exists in the vicinity of the relevant pixel or in a region where pixels having a gradation value identical to that of the relevant pixel are arranged in a row from the relevant pixel, since the relevant pixel is excluded from an object to be corrected, a region including gradation is not corrected. Thus, a new color is added to the region including gradation through correction, so that the original image quality can be prevented from being degraded.

Further, the above-described distance information from the white region is transferred, and a region having a predetermined width while being adjacent to a region of "Color" other than white is selected as an object to be corrected, so that correction can be prevented from being performed with respect to a section being in contact with the white region. Thus, when a misregistration occurs, a color, which does not originally exist, can be prevented from occurring in the section in contact with the white region.

Furthermore, when correction is performed, in the case in which a gradation value of a region to be corrected is not 255 (jet black), correction is performed such that the original color of the monochromatic K is represented by the composite K, so that the color tone can be prevented from being changed by correction.

According to the embodiment as described above, the print data generated in the PDL format by the host computer 1 is transmitted to the printer 2, and the generation and correction of the bit map data are performed in the printer 2. However, the generation and correction of the bit map data may be performed in the host computer 1. In such a case, the printer driver 11 performs the correction process as the measure against misregistration in the same manner, and transmits print data including the corrected bit map data to the printer 2. In addition, after the above-described conversion table 30 is generated in the printer 2 in the same manner, the conversion table 30 is transmitted to the host computer 1 and maintained therein.

The scope of the invention is not limited to the above-described embodiments and covers the inventions set forth in the appended claims and equivalents thereof.

What is claimed is:

1. An image forming apparatus, comprising:
    a generating unit that generates a target image that includes a first region formed using colorants of a black color and not using colorants of remaining colors, and a second region formed using the colorants of the remaining colors and not using the colorants of the black color, and
    an image forming unit that performs image formation by using colorants of various colors, wherein,
    the generating unit, in relation to the target image, when the first region is adjacent to the second region, generates the first region using the colorants including the remaining colors based on conversion information generated in response to the remaining colors of the second region, and
    the conversion information includes density gradation values of each color when a monochromatic black color is represented by a mixed color.

2. The image forming apparatus according to claim 1, wherein the conversion information is prepared for each remaining color of the second region, and is set such that the density gradation value of a target color, for which the conversion information is prepared, is higher than the density gradation values of colors other than the target color.

3. The image forming apparatus according to claim 1, wherein the conversion information is generated based on highest density values of each color, which are output from an image forming apparatus serving as a reference, according to reference information generated in advance with respect to the image forming apparatus.

4. The image forming apparatus according to claim 2, wherein the density gradation value of the target color is set to be equal to or higher than a value established in advance.

5. An image forming method in an image forming apparatus that performs image formation by using various colorants, wherein,
    in relation to a target image, when a first region formed using colorants of a black color and not using colorants of remaining colors is adjacent to a second region formed using the colorants of the remaining colors and not using the colorants of the black color, the first region is generated using the colorants including the remaining colors based on conversion information generated in response the remaining colors of the second region, and
    the conversion information includes density gradation values of each color when a monochromatic black color is represented by a mixed color.

6. A non-transitory computer readable recording medium having stored thereon a print data generation program that causes a host device of an image forming apparatus to execute a process of generating print data for the image forming apparatus that performs image formation by using various colorants, the print data generation program causing the host device to execute a process of, in relation to a target image, when a first region formed using colorants of a black color and not using colorants of remaining colors is adjacent to a second region formed using the colorants of the remaining colors and not using the colorants of the black color, setting the first region as the print data generated using the colorants including the remaining colors based on conversion information generated in response the remaining colors of the second region,
    wherein the conversion information includes density gradation values of each color when a monochromatic black color is represented by a mixed color.

* * * * *